(12) United States Patent
Kang et al.

(10) Patent No.: US 11,182,917 B2
(45) Date of Patent: Nov. 23, 2021

(54) STEREO CAMERA DEPTH DETERMINATION USING HARDWARE ACCELERATOR

(71) Applicants: Baidu USA, LLC, Sunnyvale, CA (US); Baidu.com Times Technology (Beijing) Co., Ltd., Beijing (CN)

(72) Inventors: Le Kang, Mountain View, CA (US); Yupeng Li, Tianjin (CN); Wei Qi, Beijing (CN); Yingze Bao, Mountain View, CA (US)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/483,399

(22) PCT Filed: Dec. 8, 2017

(86) PCT No.: PCT/CN2017/115228
§ 371 (c)(1),
(2) Date: Aug. 2, 2019

(87) PCT Pub. No.: WO2019/109336
PCT Pub. Date: Jun. 13, 2019

(65) Prior Publication Data
US 2020/0013176 A1 Jan. 9, 2020

(51) Int. Cl.
*G06T 7/55* (2017.01)
*G06N 20/00* (2019.01)
(Continued)

(52) U.S. Cl.
CPC ............ *G06T 7/55* (2017.01); *G06F 9/30025* (2013.01); *G06F 9/5027* (2013.01); *G06N 3/082* (2013.01);
(Continued)

(58) Field of Classification Search
CPC . G06T 7/55; G06T 7/593; G06T 2207/20081; G06T 2207/20084;
(Continued)

(56) References Cited

U.S. PATENT DOCUMENTS 10,015,478 B1 * 7/2018 Rabin ................. G06K 9/4604
10,152,120 B2 * 12/2018 Saisho ............... G01C 21/3697
(Continued)

FOREIGN PATENT DOCUMENTS

CN 106228240 A 12/2016
CN 106600583 A 4/2017
(Continued)

OTHER PUBLICATIONS

Wikipedia, "Kinect," [online], [retrieved Apr. 13, 2018]. Retrieved from Internet <URL: https://en.wikipedia.org/wiki/Kinect> (23 pgs).
(Continued)

*Primary Examiner* — Matthew C Bella
*Assistant Examiner* — Kathleen M Broughton
(74) *Attorney, Agent, or Firm* — North Weber & Baugh LLP

(57) ABSTRACT

Described herein are systems and methods that allow for dense depth map estimation given input images. In one or more embodiments, a neural network model was developed that significantly differs from prior approaches. Embodiments of the deep neural network model comprises more computationally efficient structures and fewer layers but still produces good quality results. Also, in one or more embodiments, the deep neural network model may be specially configured and trained to operate using a hardware accelerator component or components that can speed computation and produce good results, even if lower precision bit representations are used during computation at the hardware accelerator component.

20 Claims, 36 Drawing Sheets

(51) Int. Cl.
*G06F 9/30* (2018.01)
*G06F 9/50* (2006.01)
*G06N 3/08* (2006.01)
*G06N 5/04* (2006.01)

(52) U.S. Cl.
CPC .............. *G06N 5/04* (2013.01); *G06N 20/00* (2019.01); *G06T 2207/20081* (2013.01); *G06T 2207/20084* (2013.01)

(58) Field of Classification Search
CPC ........ G06N 20/00; G06N 3/082; G06N 3/063; G06N 3/0481; G06N 3/0454; G06N 3/084; G06N 5/04; G06F 9/30025; G06F 9/5027; H04N 13/239
See application file for complete search history.

(56) References Cited

U.S. PATENT DOCUMENTS

| | | | |
|---|---|---|---|
| 2012/0019528 A1 | 12/2012 | Ugawa et al. | |
| 2013/0156278 A1* | 6/2013 | Kim | G06K 9/00288 382/118 |
| 2014/0064608 A1 | 3/2014 | Kim et al. | |
| 2015/0170371 A1 | 6/2015 | Muninder et al. | |
| 2016/0360174 A1* | 12/2016 | Tao | G06T 5/007 |
| 2017/0100092 A1 | 4/2017 | Kruse et al. | |
| 2017/0270408 A1* | 9/2017 | Shi | G06N 3/04 |
| 2017/0286830 A1* | 10/2017 | El-Yaniv | G06N 3/0481 |
| 2017/0323197 A1* | 11/2017 | Gibson | G06N 3/063 |
| 2018/0046894 A1* | 2/2018 | Yao | G06F 7/483 |

FOREIGN PATENT DOCUMENTS

| | | | |
|---|---|---|---|
| CN | 106683182 A | 5/2017 | |
| CN | 106796668 A | 5/2017 | |
| CN | 107239829 A | * 10/2017 | ............. G06F 7/483 |
| CN | 107239829 A | 10/2017 | |
| CN | 107274445 A | 10/2017 | |
| CN | 107403221 A | 11/2017 | |
| CN | 107403415 A | 11/2017 | |
| JP | 2012029169 A | 2/2012 | |
| TW | 550519 B | 9/2003 | |

OTHER PUBLICATIONS

Wikipedia, "Softkinetic," [online], [retrieved /Apr. 13, 2018]. Retrieved from Internet <URL: https://en.wikipedia.org/wiki/Softkinetic> (2 pgs).
Wikipedia, "Velodyne LiDAR," [online], [retrieved Apr. 13, 2018]. Retrieved from Internet <URL: https://en.wikipedia.org/wiki/Velodyne_LiDAR> ( 5 pgs).
Hsieh and Lin,"VLSI Architecture for Block-Matching Motion Estimation Algorithm,"IEEE Transactions on Circuits and Systems for Video Technolooy. vol. 2, No. 2, Jun. 1992, (7 pgs).
Hirschmuller, "Stereo Processing by Semiglobal Matching and Mutual Information,"IEEE Transactions on Pattern Analysis and Machine Intelligence, vol. 30, No. 2, Feb. 2008 (14 pgs).
Nikolaus Mayer et al., "A Large Dataset to Train Convolutional Networks for Disparity, Optical Flow, and Scene Flow Estimation,"<URL: https://arxiv.org/pdf/1512.02134.pdf>, Dec. 7, 2015 (14 pgs).
"Zed, 2K Stereo Camera," [online], [retrieved Apr. 13, 2018]. Retrieved from Internet <URL: https://www.stereolabs.com/> (4 pgs).
"Duo MLX," [online], [retrieved Apr. 13, 2018]. Retrieved from Internet: <URL: https://duo3d.com/> (3 pgs).
"EZ-USB FX3TM SuperSpeed USB 3.0 peripheral controller," [online], [retrieved Apr. 13, 2018]. Retrieved from Internet: <URL:http://www.cypress.com/products/ez-usb-fx3-superspeed-usb-30-peripheral-controller> (3 pgs).
Michael Newberry,"Tech Note: Pixel Response Effects on CCD Camera Gain Calibration," [online], [retrieved Apr. 13, 2018]. Retrieved from Internet <URL: https://www.mirametrics.com/tech_note_ccdgain.php> (8 pgs).
Alexey Dosovitskiy et al., "FlowNet: Learning Optical Flow with Convolutional Networks," <URL: https://arxiv.org/pdf/1504.06852.pdf>, May 4, 2015, (13 pgs).
International Search Report dated Jul. 31, 2018, in International Application No. PCT/CN2017/115228, filed Dec. 8, 2017 (3pgs).
Written Opinion dated Jul. 31, 2018, in International Application No. PCT/CN2017/115228, filed Dec. 8, 2017 (4pgs).
Chinese Office Action dated Oct. 10, 2020, in Chinese Application No. CN201780090034.6A. (24pgs).
Diaz et al.,"High Performance Stereo Computation Architecture," In International Conference on Field Programmable Logic and Applications, 2005. (6pgs).
Poggi et al.,"Efficient Confidence Measures for Embedded Stereo," In international conference on image analysis and processing, 2017. (12pgs).
Kendall et al., "End-to-End Learning of Geometry and Context for Deep Stereo Regression," In IEEE International Conference on Computer Vision (ICCV), 2017. (10 pgs).
The Extended European Search Report dated Apr. 1, 2020, in European Application No. EP17933955.1A. (9pgs).
Matteo Poggi et al.,"Efficient Confidence Measures for Embedded Stereo", Oct. 13, 2017, International Conference on Financial Cryptography and Data Security, [Lecture Notes in Computer Science; Lect.Notes Computer], Springer, Berlin, Heidelberg,pp. 483-494, XP047450869, ISBN: 978-3-642-17318-9. (12 pgs).
Alex Kendall et al.,"End-to-End Learning of Geometry and Context for Deep Stereo Regression", arxiv.org, Cornell University Library, 201 Olin Library Cornell University Ithaca.
NY 14853, Mar. 13, 2017, XP080756540, DOI: 10.1109/ICCV.2017.17 (10pgs).
Javier Diaz et al., "High Performance Stereo Computation Architecture", Proceedings/ 2005 International Conference on Field Programmable Logic and Applications.
(FPL): Tampere Hall, Tampere, Finland, Aug. 24-26, 2005, leee Operations Center, Piscataway, Nj, Aug. 24, 2005, pp. 463-468, XP010839939, Doi:10.1109/Fpl.2005.1515765 ISBN: 978-0-7803-9362-2. (6pgs).
Chinese Office Action dated Jun. 28, 2021, in Chinese Application No. CN201780090034.6A. (9pgs).

* cited by examiner

STEREO CAMERA DEPTH DETERMINATION USING HARDWARE ACCELERATOR

CROSS-REFERENCE TO RELATED APPLICATIONS

This patent application is filed pursuant to 35 USC § 371 as a US National Phase Application of International Patent Application No. PCT/CN2017/115228, filed on Dec. 8, 2017, entitled "STEREO CAMERA DEPTH DETERMINATION USING HARDWARE ACCELERATOR," listing Le Kang, Yupeng Li, Wei Qi, and Yingze Bao as inventors, which patent document is incorporated by reference herein in its entirety and for all purposes.

TECHNICAL FIELD

The present disclosure relates generally to systems and methods for image processing; and more particularly deals with system and methods for efficiently generating depth information from stereo images.

BACKGROUND

To solve many computer vision tasks, such as three-dimensional reconstruction, structure from motion, visual simultaneous localization and mapping (SLAM), face recognition, safety surveillance, autonomous vehicles, scene understanding, and the like, both the depth image and the regular image are useful inputs. A typical camera acquires color information (Red, Green, and Blue (RGB)) of each pixel of an image. A depth camera or depth camera system attempts to acquire spatial coordinates of each pixel in an image. Traditionally, depth images and regular images have been captured by two different physical cameras or two different sets of sensors.

Existing depth cameras are generally classified into two categories: active depth camera and passive depth camera. An active depth camera emits energy, usually in the form of infrared light or a laser, into the environment, captures the reflection of the energy, and calculates depth information based on the reflection. Examples of active cameras include the Kinect system by Microsoft Corporation of Redmond, Wash., USA. However, such systems are expensive, particularly in comparison to passive depth cameras. Also, because such systems typically use infrared emitters and collectors, they do not work well in outdoor settings because sunlight is too intense. Other active depth camera use lasers, but these systems are very expensive, costing in the tens of thousands of dollars or even more, and tend to consume a lot of energy.

A passive depth camera typically measures natural light to estimate depth. Most passive depth cameras are equipped with two cameras, otherwise known as stereo cameras. Depth information is estimated by comparing the disparity of the same element in a scene captured in two camera images. Stereo depth camera that use native methods simply extract texture or features from the image and measure their disparity in the stereo (e.g., left and right) images. For a region that does contain any features or texture, such as a white wall, bright floor, uniform color, etc., the disparity may not successfully be extracted, and thus no depth information can be estimated. Unfortunately, textureless or featureless regions are common in nature scene. As a result, the depth image produced by stereo depth camera using native algorithms usually misses many pixels that severely and adversely affect the applications.

To counter some of these issues, some stereo depth camera systems use sophisticated algorithms. However, these sophisticated methods usually require high computational power. Hence, their corresponding products usually require expensive graphics processor units, high-end central processing units, or both. Another issue with using complex methods for determining depth, besides the energy and computation costs, is the time required to determine the depth by comparing the stereo images. Even with increasing processor speeds, this time delay can be significant enough to make such methods impractical for applications that benefit from receiving depth information in real-time or near real-time, such as robotics or self-driving cars. For example, if the delay in determining the depth information is too substantial, an autonomous vehicle may crash or otherwise cause serious harm.

Accordingly, what is needed are systems and methods that can provide high quality dense depth maps in real-time or near real-time.

SUMMARY

Embodiments of the present disclosure provide an image processing system, and a method for processing image data to obtain depth information related to a scene captured by a pair of images.

In an aspect of the disclosure, the image processing system comprises: a processor unit; and a non-transitory computer-readable medium or media comprising one or more sequences of instructions which, when executed by the processor unit, causes steps to be performed comprising: receiving a pair of images of a scene, in which the pair of images comprises a first image and a second image; performing depth map inference using the pair of images and a trained neural network model that comprises a plurality of operations, in which at least some of the operations of the plurality of operations of the trained neural network model are performed by a hardware accelerator component that is communicatively coupled to the processor unit; and outputting a depth map comprising distance information to surfaces in the scene; and a hardware accelerator component configured to perform at least some of the operations of the trained neural network model using a different bit representation than that used by the processor unit.

In another aspect of the disclosure, the image processing system comprises: a processor unit; and a non-transitory computer-readable medium or media comprising one or more sequences of instructions which, when executed by the processor unit, causes steps to be performed comprising: receiving a pair of images of a scene, in which the pair of images comprises a first image and a second image; performing depth map inference using the pair of images and a trained neural network model that comprises a plurality of operations, including a plurality of convolutions and deconvolutions, and that has been configured to reduce computation requirements by: comprising at least two convolution operations each operating on image-related data corresponding the first image and the second image separately instead of operating on a combination of the image-related data corresponding to the first image and the second image and wherein the two early stage convolution operations share parameters; and not including a set of data augmentation operations and a set of one or more sampling operations that were included in a neural network model from which the trained neural network is derived; and outputting a depth map comprising distance information to surfaces in the scene; and a hardware accelerator component, communicatively coupled to the processor unit, configured to perform at least some of the operations of the trained neural network model.

In a further aspect of the disclosure, the method for processing image data to obtain depth information related to a scene captured by a pair of images comprises: receiving the pair of images, which comprises a first image and a second image, of the scene at an image processing system comprising: a processor unit configured to coordinate a workflow for a trained neural network model by assigning at least some of the computation tasks of the trained neural network model to a hardware accelerator component; a non-transitory computer-readable memory communicatively coupled to the processor unit for storing data related to the pair of images and data comprising one or more sequences of instructions related to the trained neural network; and a hardware accelerator component, communicatively coupled to the processor unit, configured to perform at least some operations of a trained neural network model using a different bit representation than that used by the processor unit; using the image processing system, performing depth map inference using the pair of images and the trained neural network model that comprises a plurality of operations, in which at least some of the operations of the plurality of operations of the trained neural network model are performed by the hardware accelerator component that is communicatively coupled to the processor unit; and outputting a depth map comprising depth information to surfaces in the scene.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
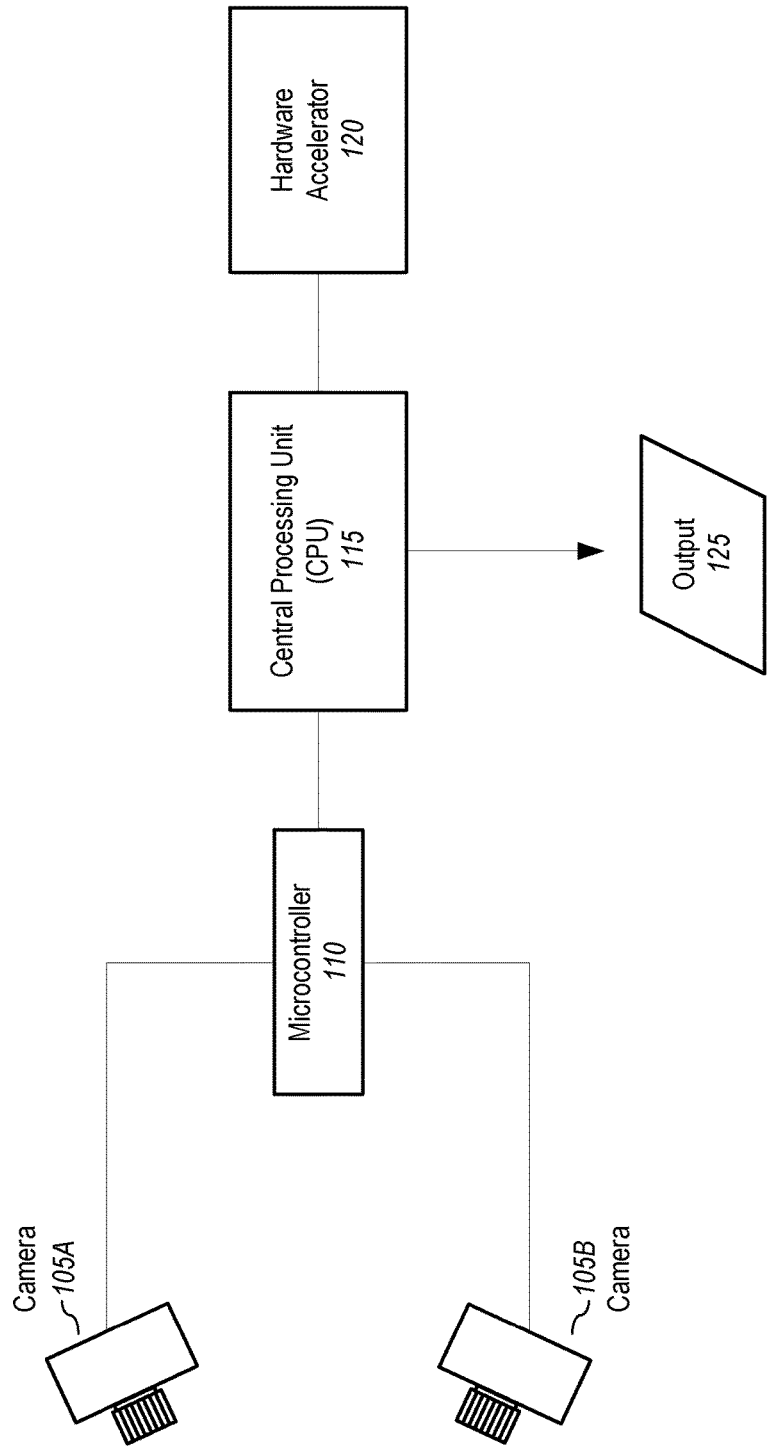
FIG. 1 depicts a depth map generator system, according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "one or more embodiments," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. General Overview

Aspects of the present invention comprise systems and methods that can produce dense depth map images, even if the scene includes textureless or featureless regions. In one or more embodiments, a depth map may be produced in real-time (or near real-time) by using certain techniques in modeling and by using a hardware accelerator or accelerators, such as a Field Programmable Gate Array (FPGA), an Application Specific Integrated Circuit (ASIC), a Digital Signal Processor (DSP), or the like.

In one or more embodiments, the depth map model may share some conceptual similarities with Dispnet, which is described by Mayer et al. in "A Large Dataset to Train Convolutional Networks for Disparity, Optical Flow, and Scene Flow Estimation," IEEE International Conference on Computer Vision and Pattern Recognition (CVPR), 2016 (also available at arXiv preprint arXiv:1512.02134, 2015), which is incorporated herein by reference in its entirety. However, as will be explained in more detail below, embodiments herein comprise, among other things, simplified neural network layers and other modifications. Also, embodiments may be designed—in training, during deployment, or both—to use 8-bit processing for efficient processing using a hardware accelerator. Previous FPGA-based stereo camera systems could only use a naïve stereo depth algorithm due to the computation and power limitations of FPGAs. However, embodiments herein provide a new architecture to run a convolutional neural network (CNN) model using a hardware accelerator like an FPGA. It should also be noted that, besides decreasing the processing time, implementing aspects of the present invention using a hardware accelerator can help reduce costs and power consumption.

B. Camera System Embodiments

FIG. 1 depicts a depth map generator system, according to embodiments of the present disclosure. The example embodiment shown in FIG. 1 includes two cameras, camera A 105A and camera B 105B, which may be installed onto a rigid physical structure, such as a camera rig, and are pointed in approximately the same direction. For convenience, the cameras may be referred to herein as the right (camera A 105A) and the left (camera B 105B), but it should be noted that they may be oriented differently (such as up and down). In one or more embodiments, the distance between the left 105B and right 105A cameras is typically between 5-50 centimeters, although other distances may be used. In one or more embodiments, the two cameras capture images (which shall be understood to mean still images, video images, or both) of the same scene but from different positions. The disparity of the same elements in the two images provide cues for estimating depth.

Also depicted in FIG. 1 is a microcontroller 110, which is communicatively coupled to each camera. In one or more embodiments, the microcontroller sends one or more control signals to the cameras, receives image data from the cameras, and transmits the image data to a processing unit (e.g., CPU 115), which is also communicatively coupled to the microcontroller 110. The microcontroller may send exposure and gain parameters to the cameras, and may send one or more exposure signals to the two cameras to insure simultaneous exposure so that the two cameras capture their respective images at the same point in time. Simultaneous exposure is important to depth estimation if the scene contains dynamic objects. An example microcontroller is the Z-USB FX3™ SuperSpeed USB 3.0 peripheral controller by Cypress Semiconductor Corporation of San Jose, Calif., USA, but other microcontrollers may be used.

As noted above, also depicted in the exemplary system embodiment show in FIG. 1 is a CPU 115, which may be an Advanced RISC Machine (ARM) CPU or a x86 CPU. ARM Cortex-A53, designed by Arm Holdings of Cambridge, England, is an example CPU that may be used, and any x86 processors will work, such as the Intel® Core i3™ 2310M, designed by Intel of Santa Clara, Calif. In one or more embodiments, the CPU 115 receives image data from the microcontroller 110, performs the overall depth map generation, and utilizes a hardware accelerator 120 that is communicatively coupled to the CPU for completing parts of the depth map generation process. In one or more embodiments, the hardware accelerator 120 may be an FPGA, ASIC, or DSP, which is configured to compute the results of parts of the neural network. In one or more embodiments, the microcontroller 110 may be removed from the system 100 if the CPU 115 functions as a microcontroller for camera control.

In one or more embodiments, the system 100 outputs 125 a depth image, such as a 16-bit image with resolution of 640×480, in which each pixel value represents a depth value. In one or more embodiments, the output 125 may also include the raw camera images (e.g., two 640×480 gray or color images) from the left and right cameras 105. The output rate depends, at least in part, upon the CPU processing rate (e.g., 10 Hz). It should be noted that other bit sizes, resolutions, and output rates may be used.

It shall also be noted that system 100 may comprise other computing system elements, such as power supply, power management, memory, interfaces, and the like, which are not shown in FIG. 1 to avoid obscuring aspects of the present invention. Some examples of such elements, and of computing systems generally, are provided with reference to FIG. 2.

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more ports for communicating with external devices as well as various input and output (I/O) devices, such as a keyboard, a mouse, touchscreen and/or a video display. The computing system may also include one or more buses operable to transmit communications between the various hardware components.

Figure 2:
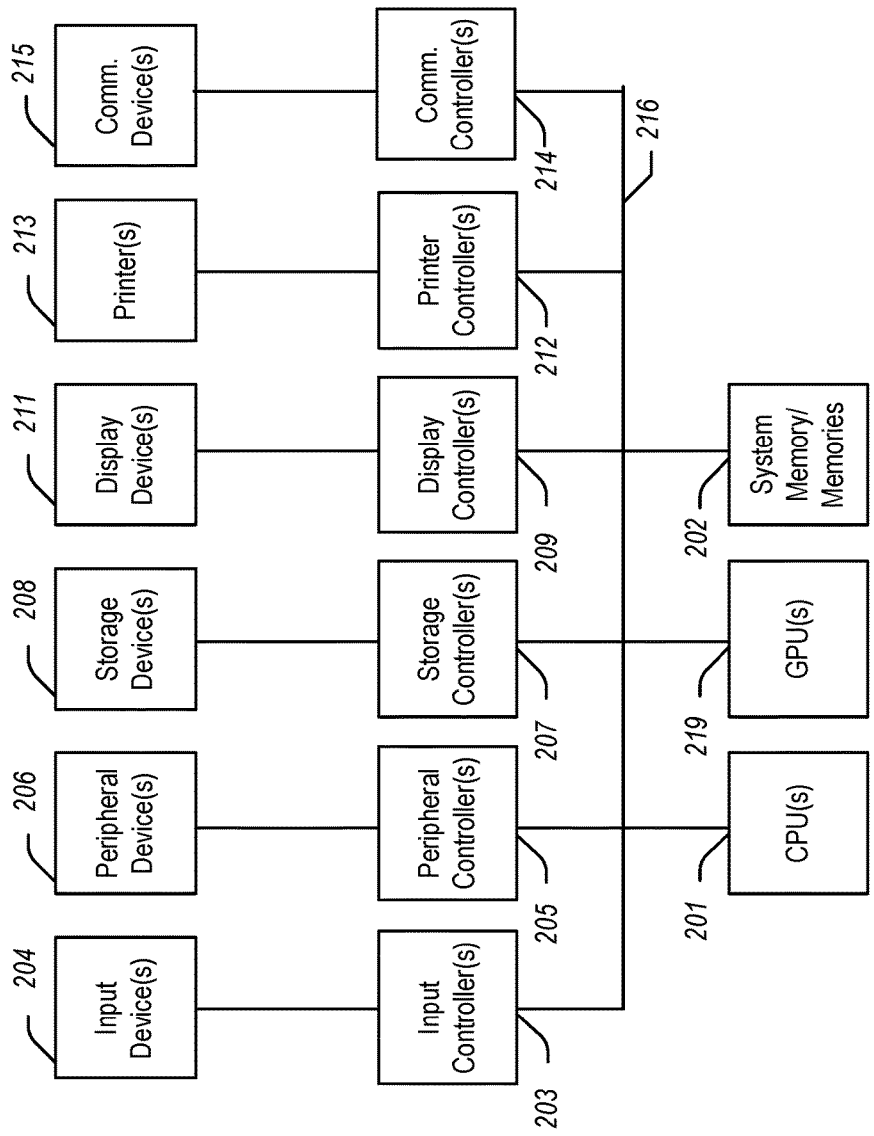
FIG. 2 depicts a simplified block diagram of a computing device/information handling system, in accordance with embodiments of the present disclosure.

FIG. 2 depicts a simplified block diagram of a computing device/information handling system (or computing system) according to embodiments of the present disclosure. It will be understood that the functionalities shown for system 200 may operate to support various embodiments of a computing system—although it shall be understood that a computing system may be differently configured and include different components, including having fewer or more components as depicted in FIG. 2.

As illustrated in FIG. 2, the computing system 200 includes one or more central processing units (CPU) 201 that provides computing resources and controls the computer. CPU 201 may be implemented with a microprocessor or the like, and may also include one or more graphics processing units (GPU) 219 and/or a floating-point coprocessor for mathematical computations. System 200 may also include a system memory 202, which may be in the form of random-access memory (RAM), read-only memory (ROM), or both.

A number of controllers and peripheral devices may also be provided, as shown in FIG. 2. An input controller 203 represents an interface to various input device(s) 204, such as a keyboard, mouse, touchscreen, and/or stylus. The computing system 200 may also include a storage controller 207 for interfacing with one or more storage devices 208 each of which includes a storage medium such as magnetic tape or disk, or an optical medium that might be used to record programs of instructions for operating systems, utilities, and applications, which may include embodiments of programs that implement various aspects of the present invention. Storage device(s) 208 may also be used to store processed data or data to be processed in accordance with the invention. The system 200 may also include a display controller 209 for providing an interface to a display device 211, which may be a cathode ray tube (CRT), a thin film transistor (TFT) display, organic light-emitting diode, electroluminescent panel, plasma panel, or other type of display. The computing system 200 may also include one or more peripheral controllers or interfaces 205 for one or more peripherals 206. Examples of peripherals may include one or more printers, scanners, input devices, output devices, sensors, and the like. A communications controller 214 may interface with one or more communication devices 215, which enables the system 200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 216, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), FPGA(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, FPGAs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

C. Example Network Structure Embodiments for Inference

FIGS. 3A-M graphically depict an example deep neural network model that has been trained and may be used to infer depth information from stereo images, according to embodiments of the present disclosure. In one or more embodiments, each box 310-*x* represents a convolution or deconvolution layer, comprises the most computation among all of the types of layers in the network 300. In one or more embodiments, each rectangle 315-*x* represents a rectified linear unit (ReLU) layer, which follows a convolution or deconvolution layer. In one or more embodiments, each rectangle 320-*x* represent one of several types of layers, including data input, slicing, element wise operation, concatenation, and output. In one or more embodiments, each octagon 325-*x* represents a block of data, or the middle results, passed between layers.

1. Main Branch Embodiments

The main structure of the depicted network embodiment 300 is first describe. Then, extra branches and skip connections between non-neighboring layers will be described.

A general overview of the main structure of depicted network embodiment is as follows. In one or more embodiments, the network 300 received a pair of images (e.g., a left image and a right image) as input, which is represented by the DualImage layer 305, and scales down their pixel values through an elementwise operation layer, which is depicted as slice_pair 320-1. In one or more embodiments, each image passes through the same two convolution layers, namely conv1s 310-1 and conv2s 310-2. In one or more embodiments, these two early stage convolution layers share parameters. Such a configuration has at least a couple significant benefits. First, by having each convolution layer operate on the images separately, rather than a stack comprising both images, means that the convolution layers are smaller, thereby requiring less memory. Second, the convolutions at this early stage are filtering at a low level; therefore, they can share parameters. Trying to share at other layers that are filtering at higher levels would result in decreased model performance.

Figure 3A:
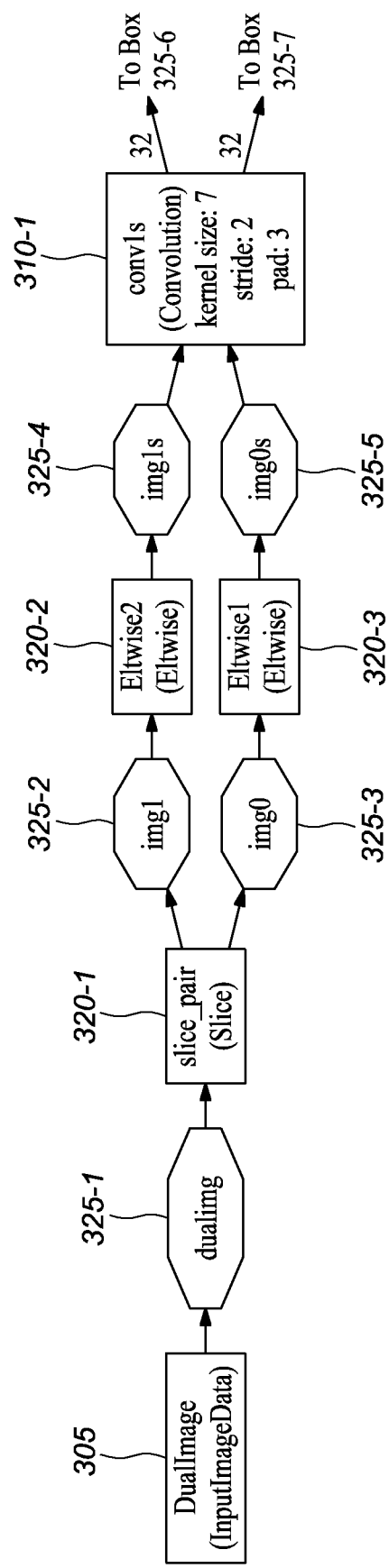
FIGS. 3A-M graphically depict an example deep neural network model that has been trained and may be deployed to infer depth information from stereo images, according to embodiments of the present disclosure.
Figure 3B:
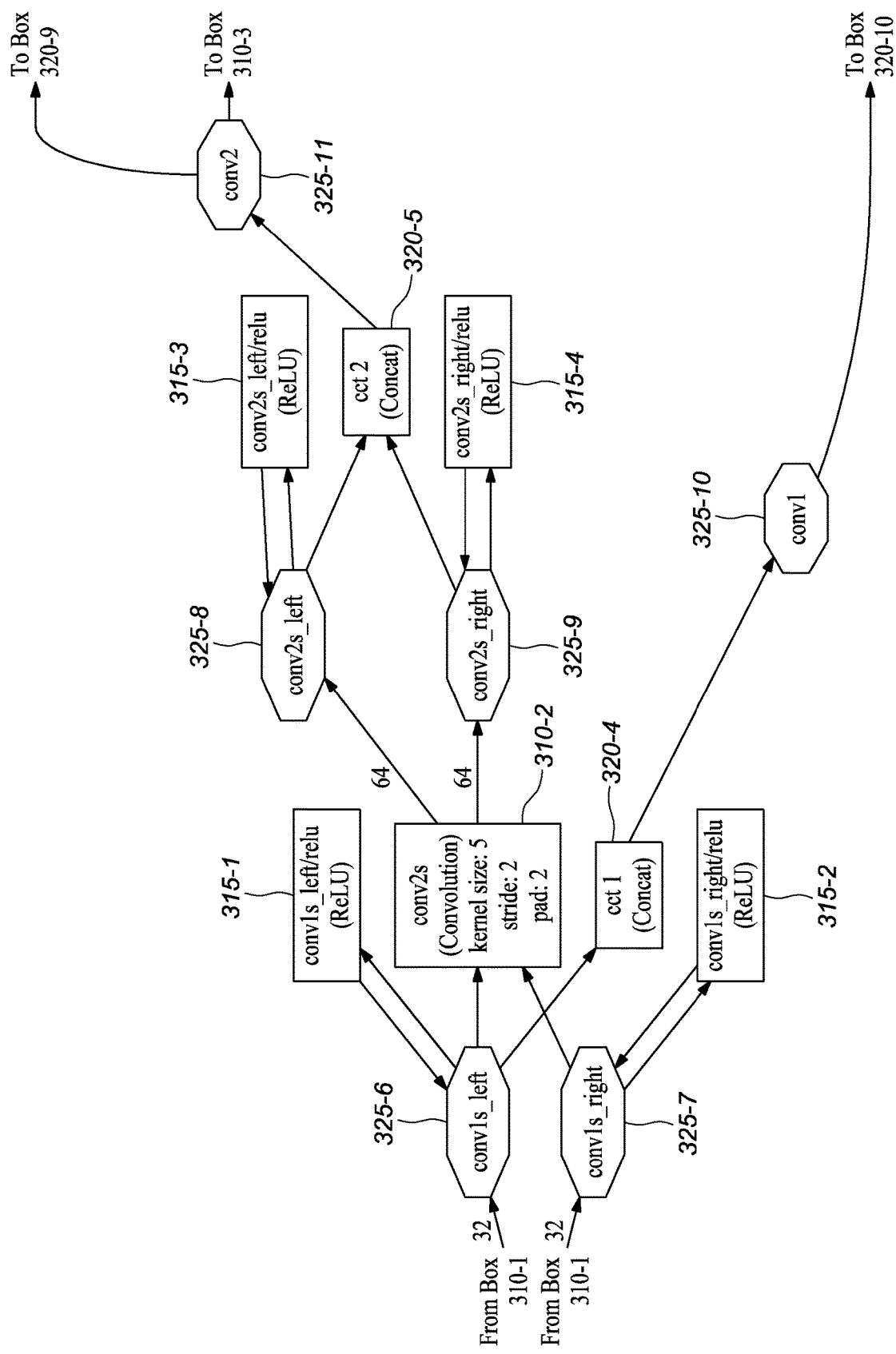
Figure 3C:
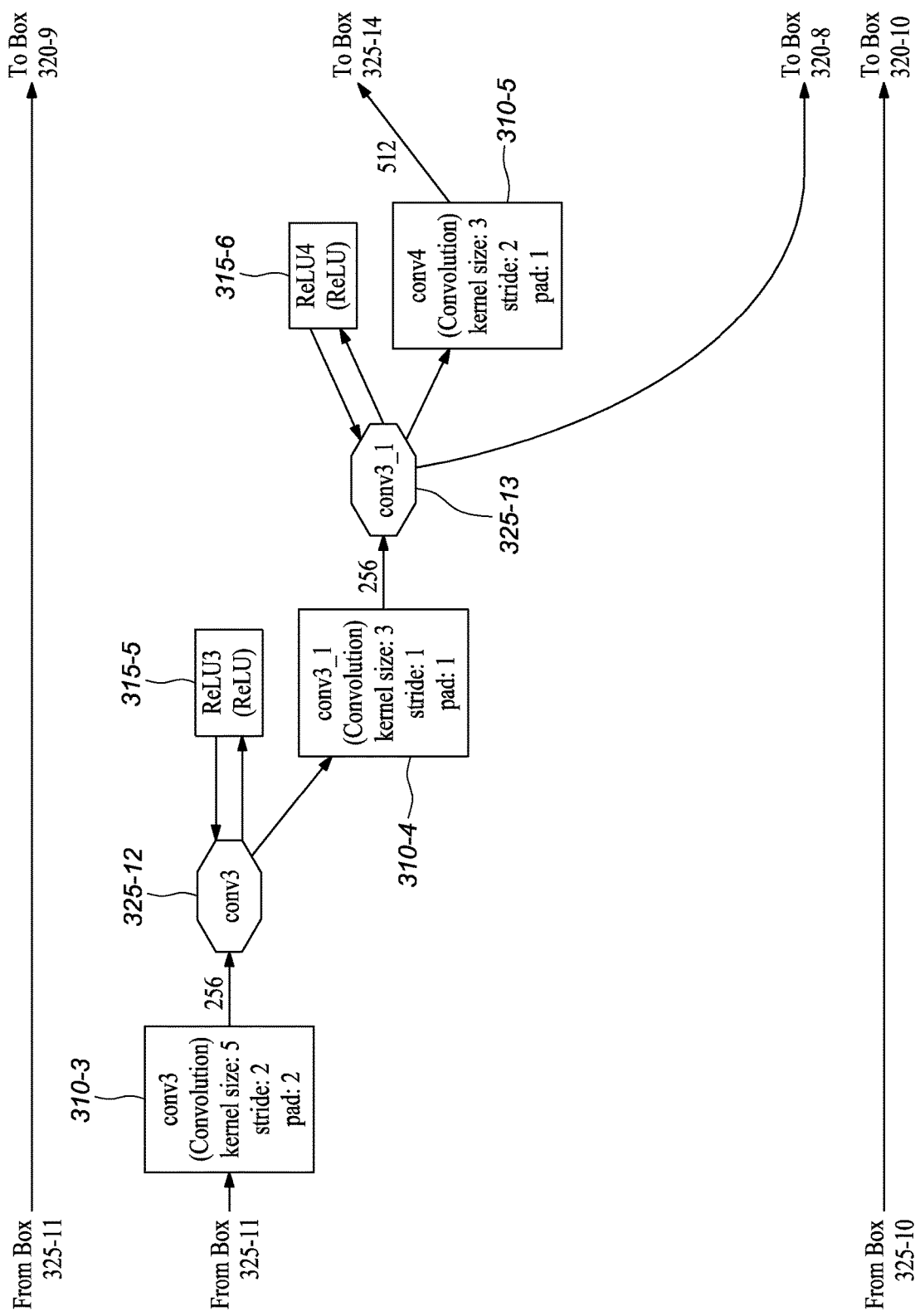
Figure 3D:
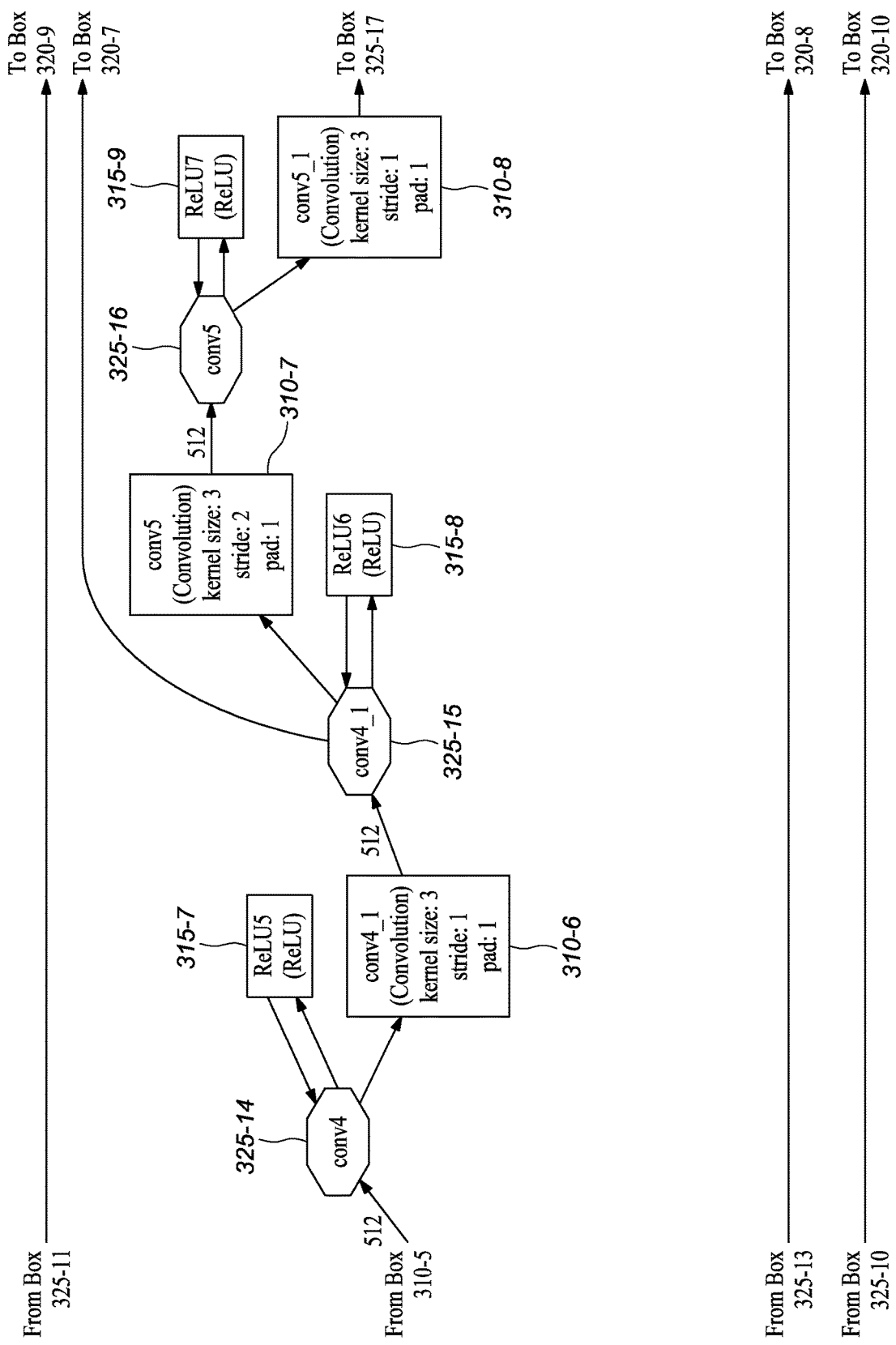
Figure 3E:
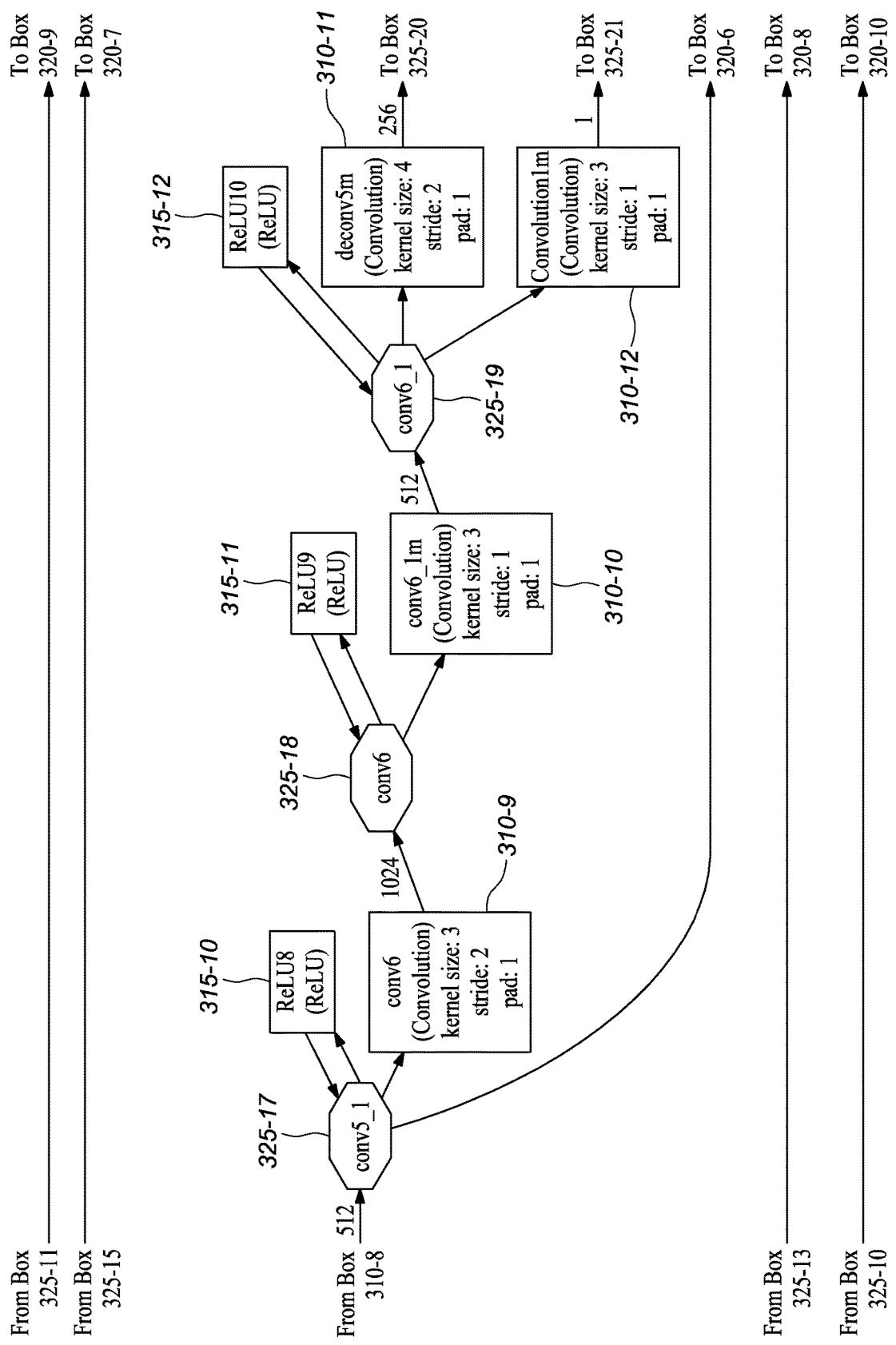

In one or more embodiments, the resulting feature maps (i.e., intermediate data blocks) get concatenated by a concatenation layer cct2 320-5, which means that starting from this layer the feature maps from the two images are combined to process together. The next eight convolutional layers—including conv3 310-3, conv3_1 310-4, conv4 310-5, conv4_1 310-6, conv5 310-7, conv5_1 310-8, conv6 310-9, and conv6_1m 310-10—may be lined up in a typical manner as depicted in FIGS. 3C-E. In one or more embodiments, these layers represent a compression stage, in which the spatial resolution (i.e., the width and height) of the feature maps in the network decreases while the number of channels increases.

In one or more embodiments, the next stage expands the spatial resolution using deconvolutions. After conv6_1m 310-10, deconvolutions, convolutions, and concatenations are interleaved almost to the output; these include deconv5m 310-11, concat2 320-6, convolution2m 310-14, deconv4 310-15, concat3 320-7, convolution4 310-18, deconv3 310-20, concat4 320-8, convolution6 310-22, deconv2 310-24, concat5 320-9, convolution8 310-26, deconv1 310-27, concat6 320-10, convolution10 310-30, convolution11 310-31.

In one or more embodiments, the convolution layer convolution11 310-31 predicts a disparity map. In a typical disparity map, the depth of a point in a scene is inversely proportional to the difference in distance of corresponding image points in the images and the camera centers. From the disparity map, depth information for pixels in an image may be derived. The last layer, DepthOutput 330, converts the disparity map to a depth map and resizes it to the desired resolution.

2. Extra Branches Embodiments

Figure 3F:
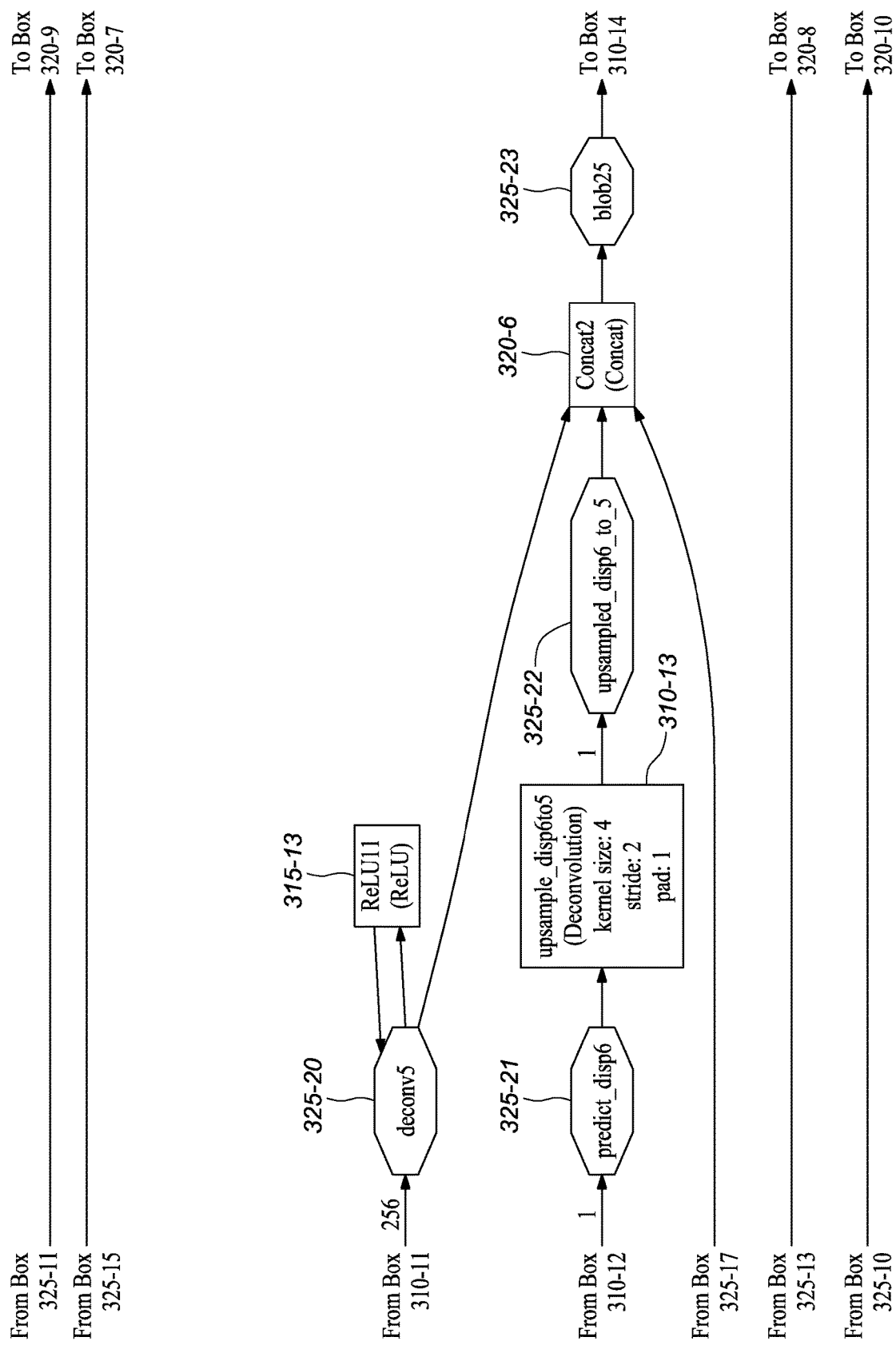
Figure 3G:
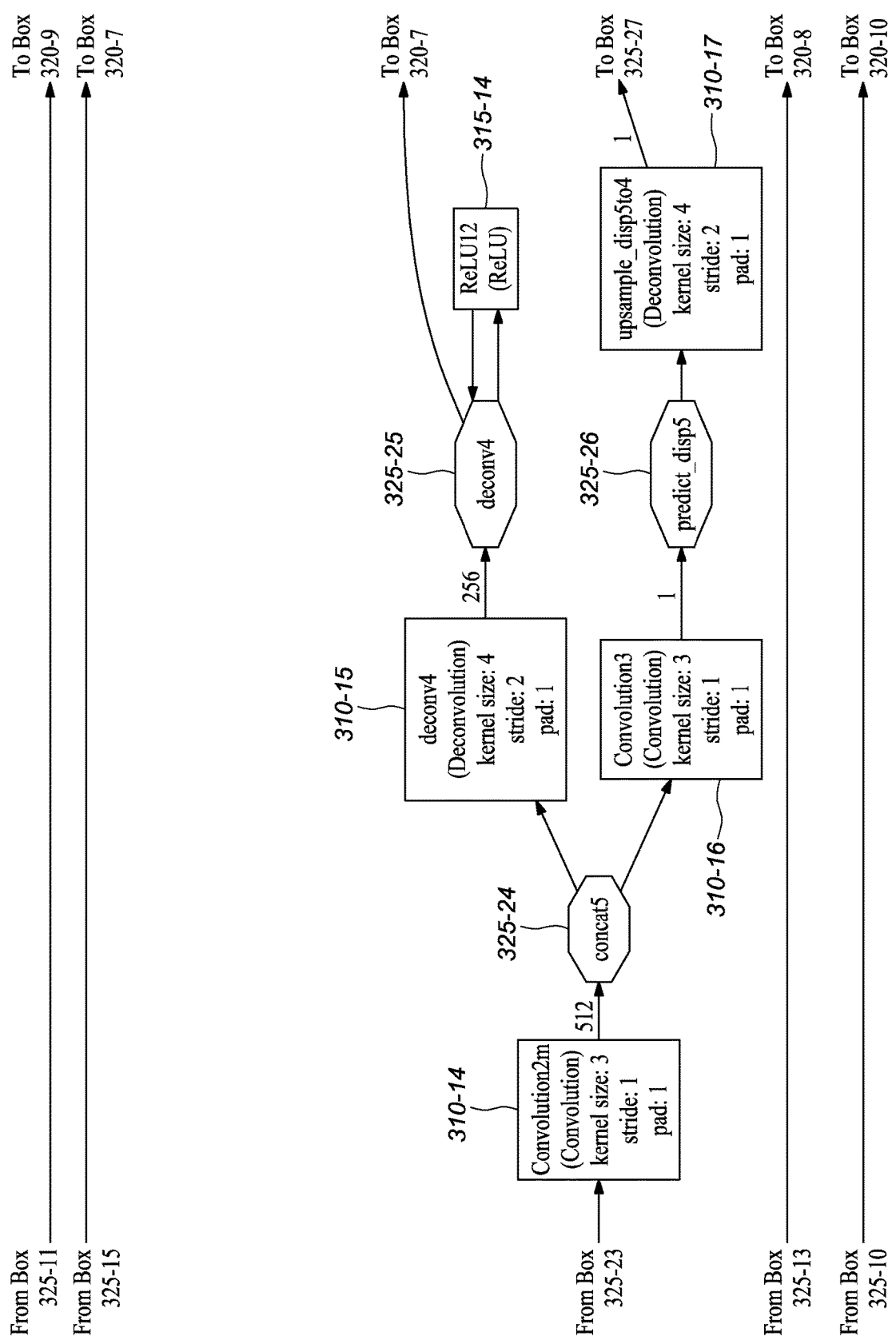
Figure 3H:
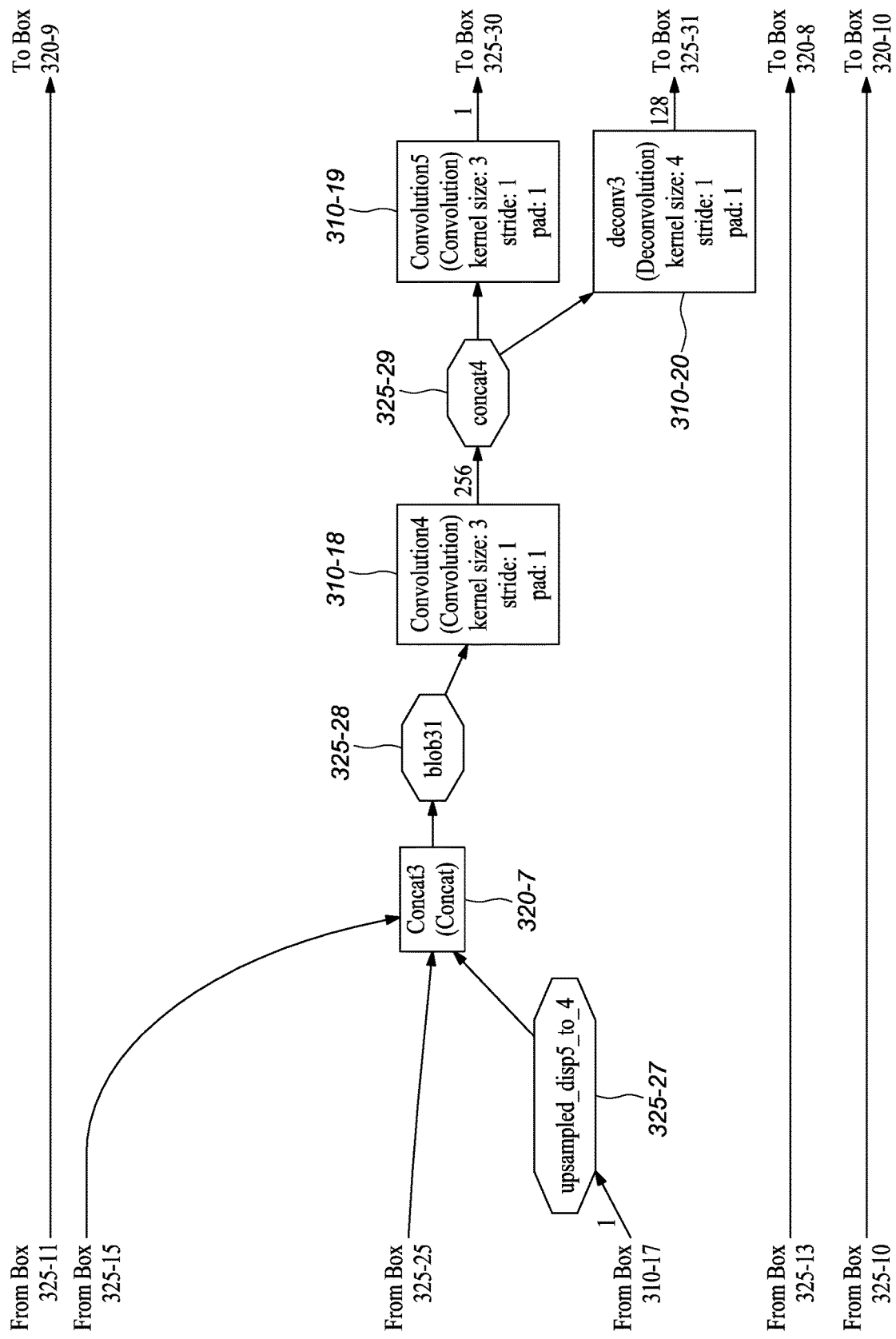
Figure 6:
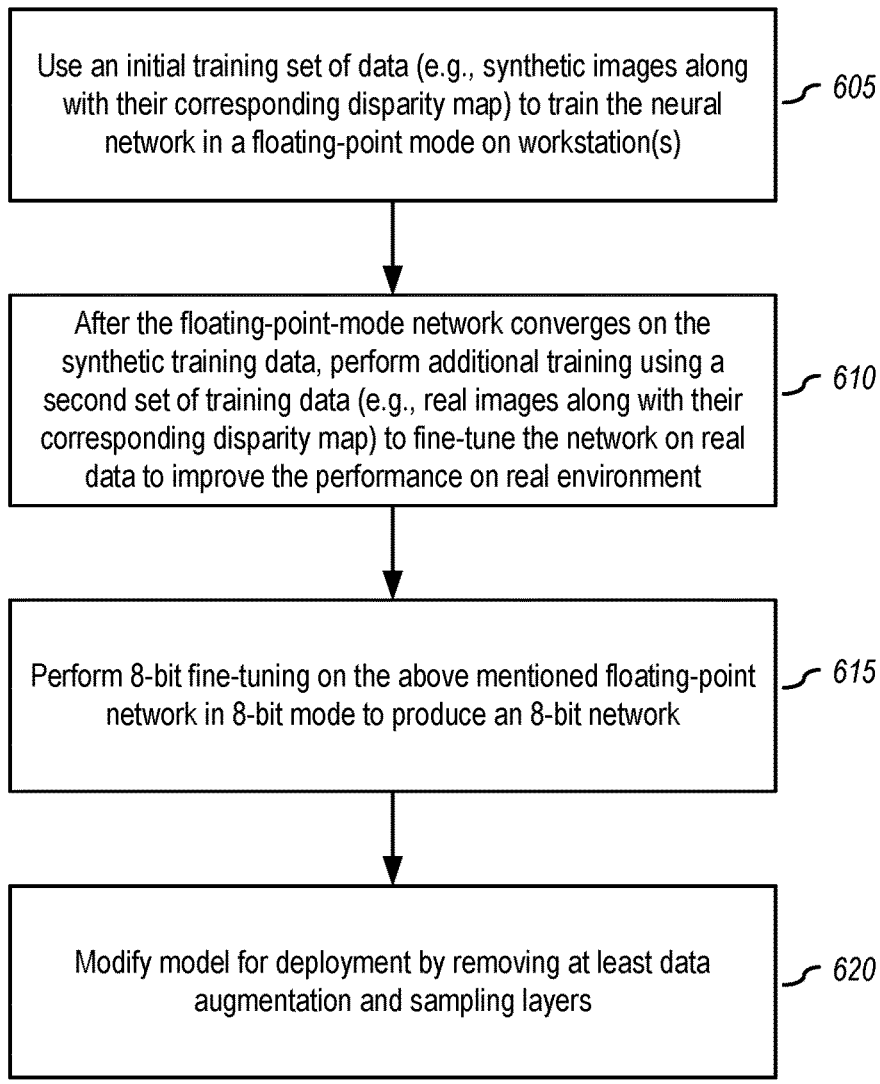
FIG. 6 depicts an example method for training a deep neural network model for depth estimation, according to embodiments of the present disclosure.
Figure 7:
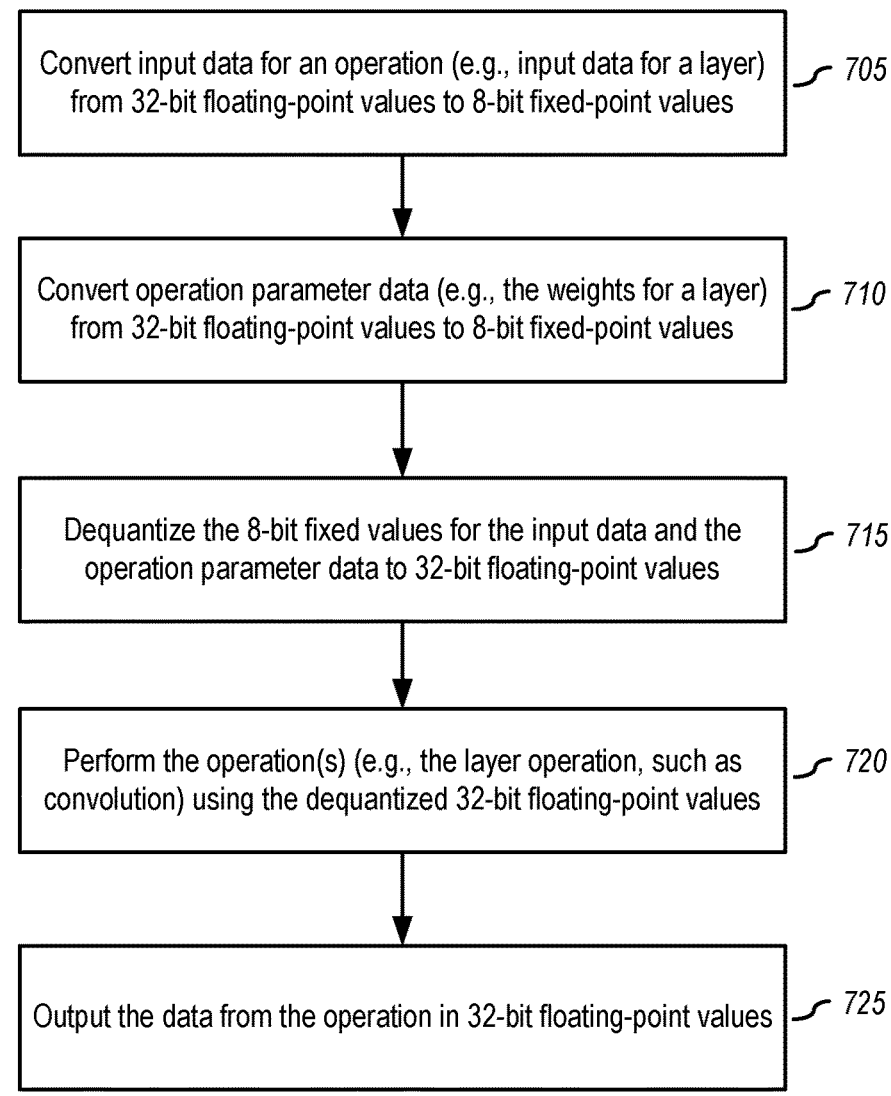
FIG. 7 depicts a method for fine-tuning, as part of training, a floating-point neural network model by simulating a different bit representation to produce a neural network for use on a hardware accelerator component that uses that bit representation, according to embodiments of the present disclosure.
Figure 9:
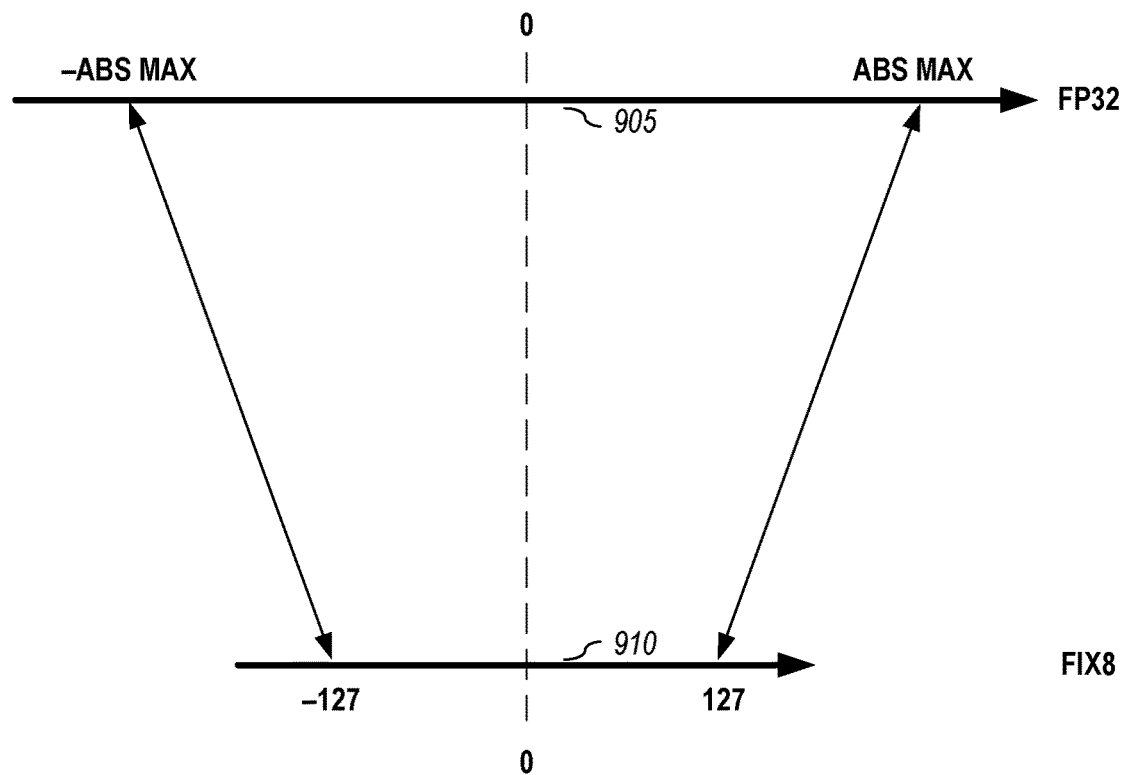
FIG. 9 graphically depicts a method for quantizing values represented in one bit representation scheme into a different bit representation scheme, according to embodiments of the present disclosure.
Figure 10:
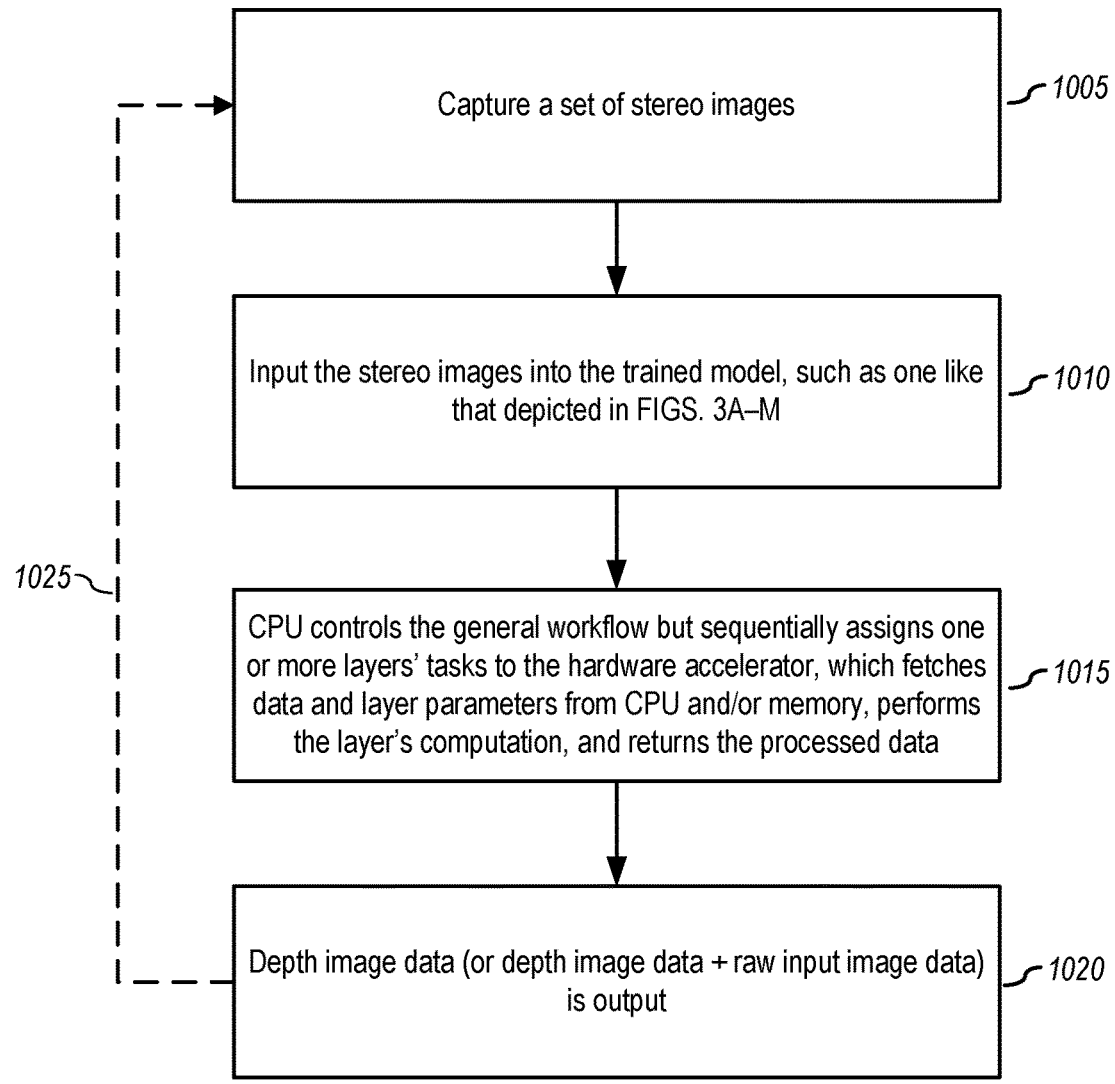
FIG. 10 depicts a method for using a trained neural network model with a hardware acceleration unit to provide dense depth map information in real-time (or near real-time), according to embodiments of the present disclosure.

As shown in FIGS. 3A-M, the depicted model includes extra branches in addition to the main branch. In one or more embodiments, Convolution1m (FIG. 3E, 310-12) branches at conv6_1 (FIG. 3E, 325-19), followed by upsample_disp6to5 (FIG. 3F, 310-13), which eventually reconnects to the main branch at Concat2 (FIG. 3F, 320-6). In the depicted embodiment, Convolution3 (FIG. 3G, 320-16) branches at concat5 (FIG. 3G, 325-24), which branch includes the deconvolution upsample_disp5to4 (FIG. 3G, 310-17) and reconnects at Concat3 (FIG. 3H, 320-7). In one or more embodiments, Convolution5 (FIG. 3H, 310-19) branches after concat4 (FIG. 3H, 325-29), which branch includes the deconvolution upsample_disp4to3 (FIG. 3I, 310-21) and joins at Concat4 (FIG. 3H, 320-29). In one or more embodiments, the model also includes a convolution, Convolution7 (FIG. 3J, 310-23), that branches at concat3 (FIG. 3J, 325-34); the branch includes the deconvolution upsample_disp3to2 (FIG. 3J, 310-25) and reconnects to the main branch at Concat5 (FIG. 3K, 320-9). In the depicted embodiment, the model also branches after concat2 (FIG. 3K, 325-39). That branch includes convolution Convolution9 (FIG. 3K, 310-28) and upsample_disp2to1 (FIG. 3L, 310-29) and reconnects at Concat6 (FIG. 3L, 320-10). It should be noted that in the depicted embodiment the octagon items indicate data blocks, which may also be referred to as BLOBs (Binary Large OBjects), and that the "concatX" octagons (325-*x*) are not concatenation layers.

3. Skip Branches Embodiments

Figure 3I:
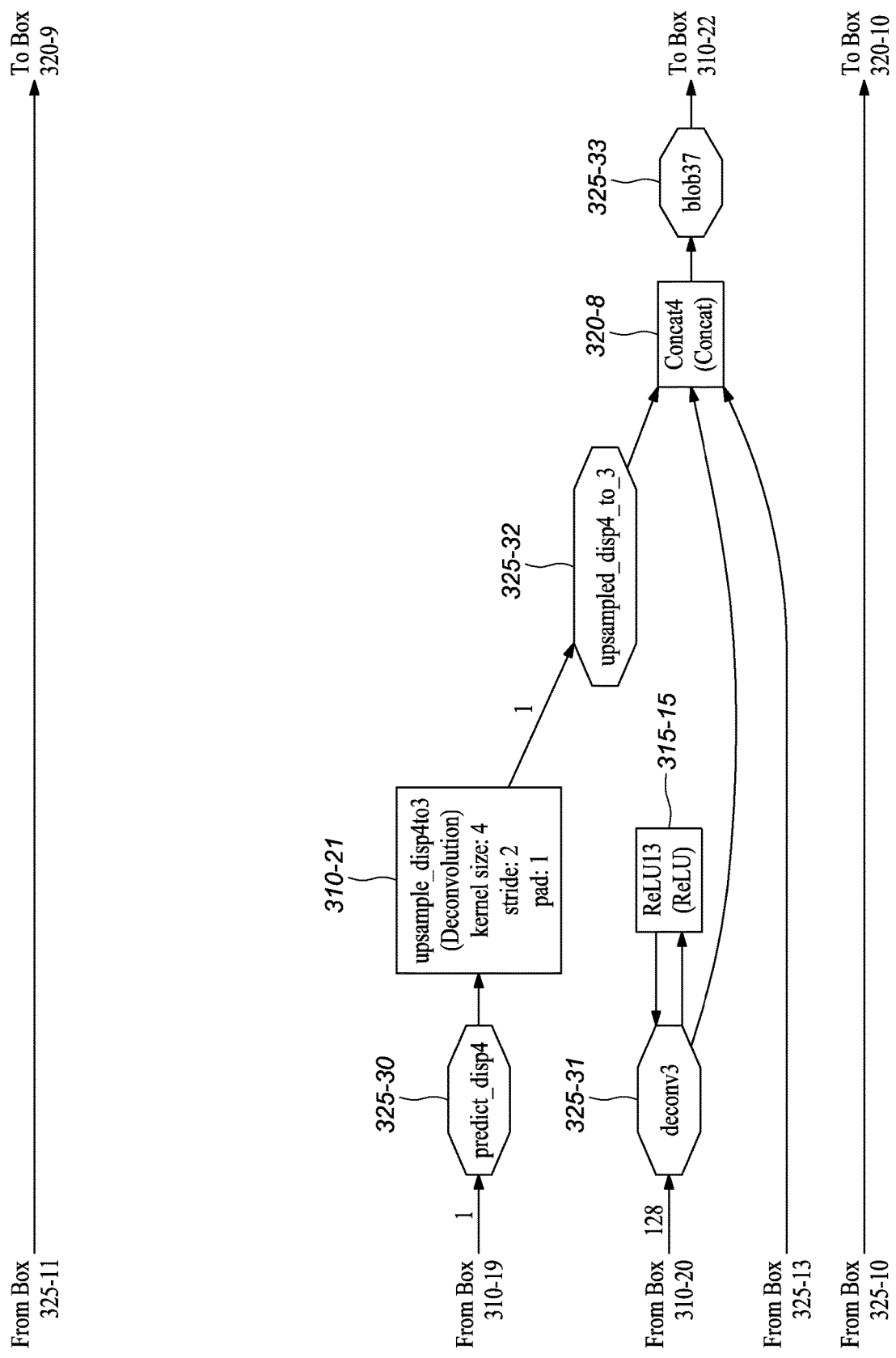
Figure 3J:
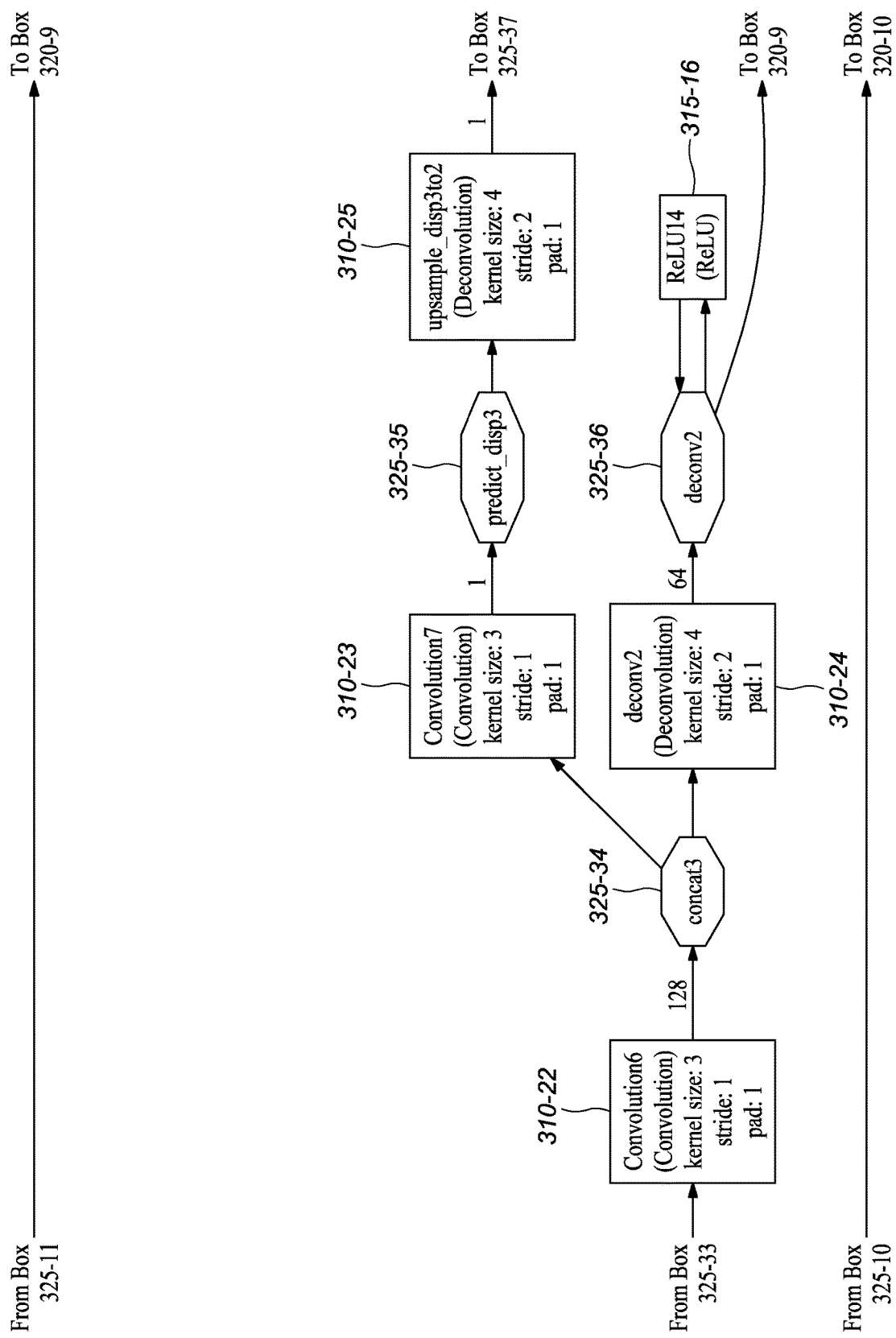
Figure 3K:
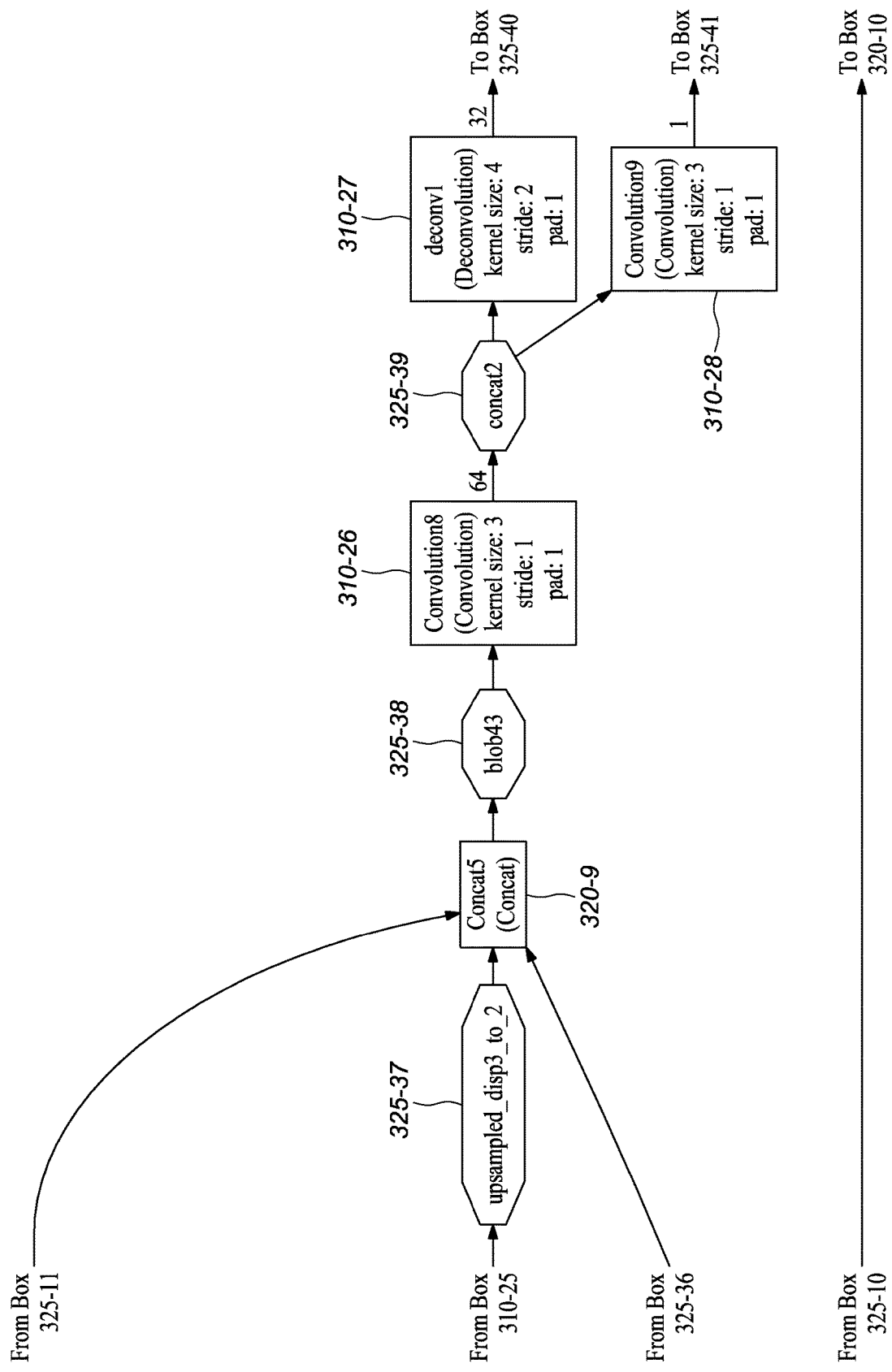
Figure 3L:
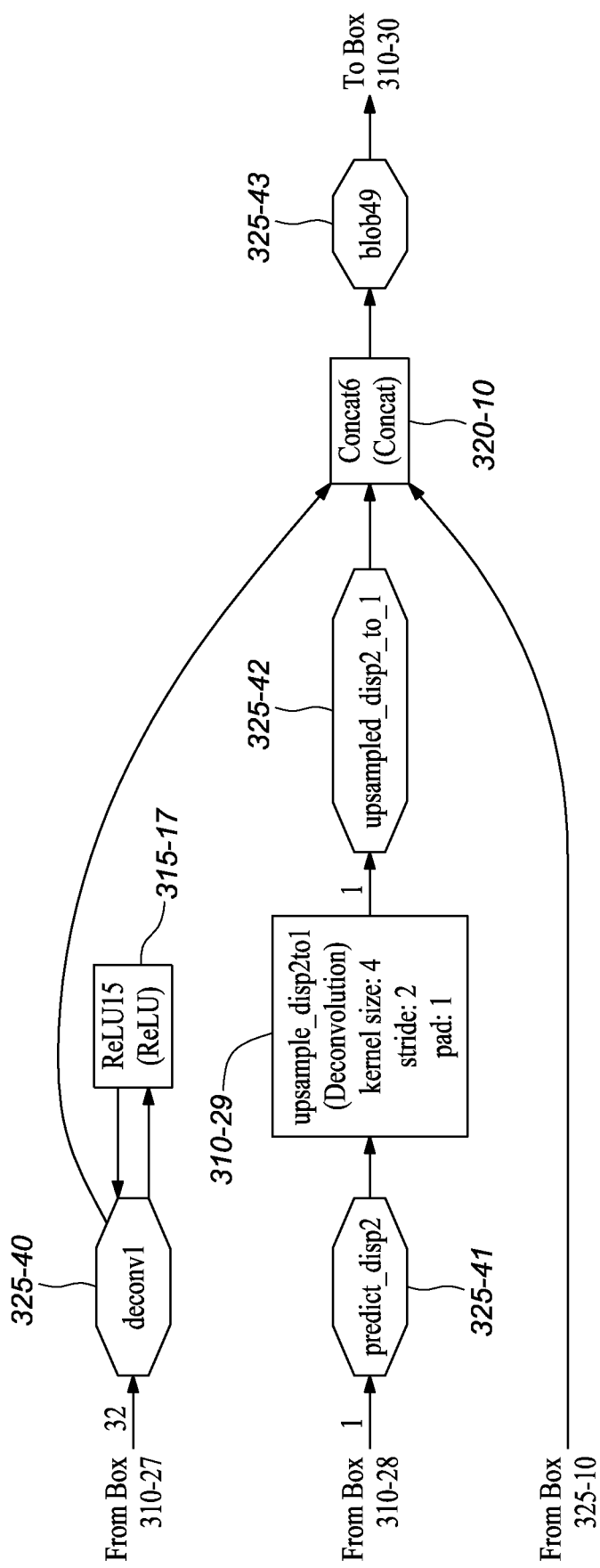
Figure 3M:
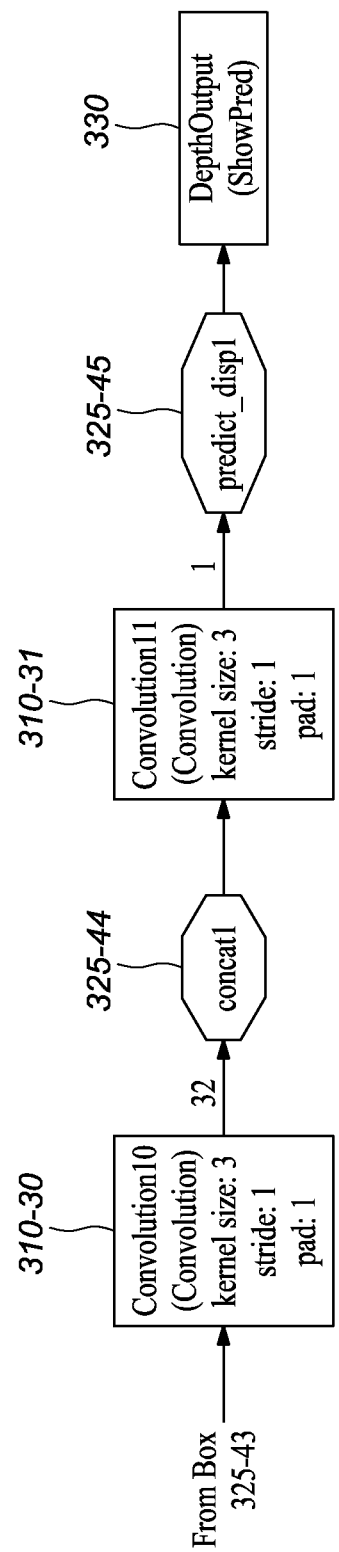
Figure 8:
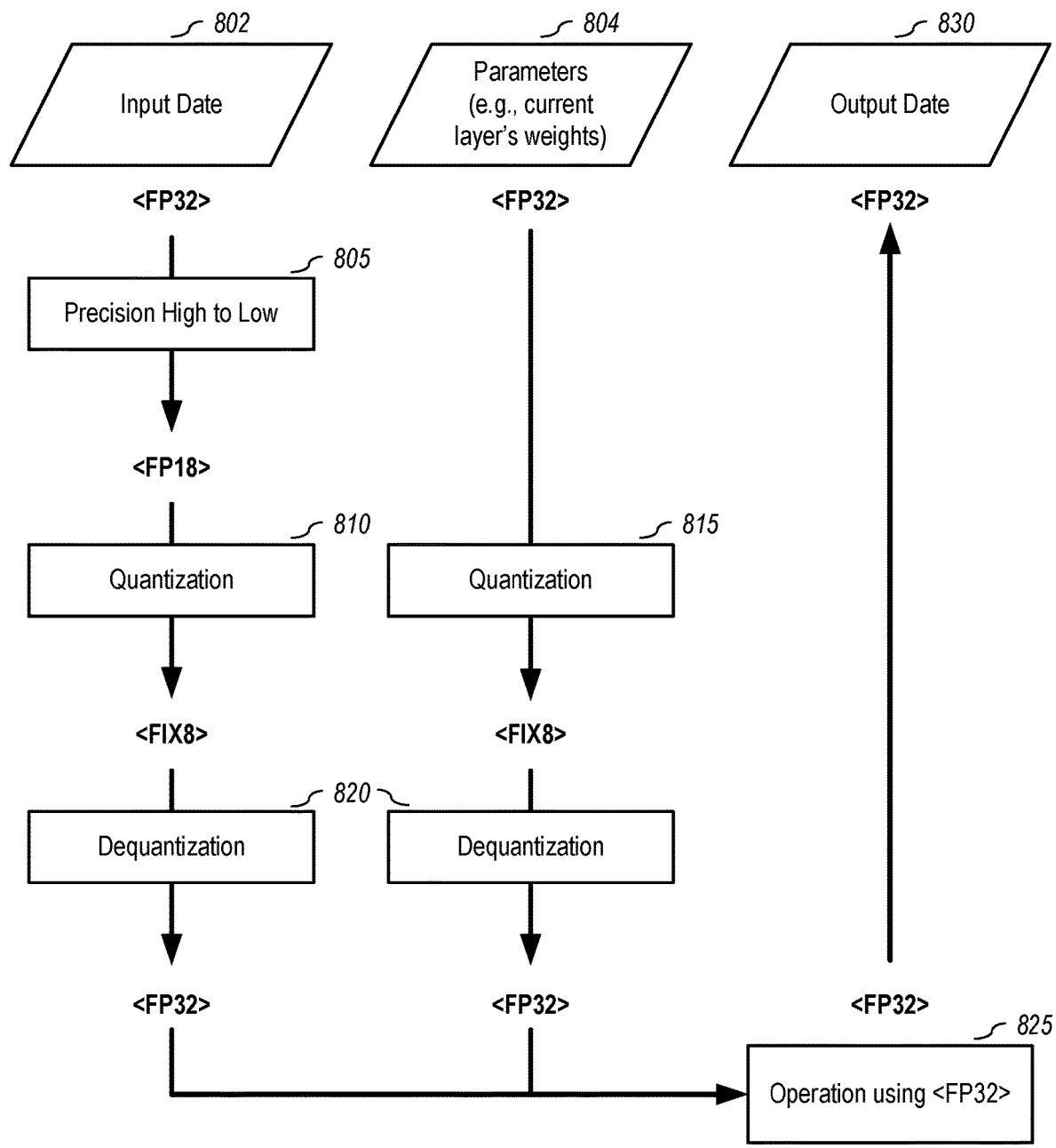
FIG. 8 graphically illustrates a method for fine-tuning, as part of training, a floating-point neural network model by simulating a certain bit representation to produce a neural network for use on a hardware accelerator component that uses that certain bit representation, according to embodiments of the present disclosure.

As shown in FIGS. 3A-L, the depicted model also includes skip branches in addition to the main branch and extra branches. For example, in the depicted embodiment, the outputs of the convolution conv1s (FIG. 3A, 310-1) for the left and right images is concatenated by the layer cc1 (FIG. 3B, 320-4), which in turn connects to Concat6 (FIG. 3L, 320-10). In the depicted embodiment, the output of the concatenation layer cc2 (FIG. 3B, 320-5) connects to Concat5 (FIG. 3K, 320-9). As shown, at conv3_1 (FIG. 3C, 325-13), a skip branch forms that connect to Concat4 (FIG. 3I, 320-8). In one or more embodiments, at conv4_1 (FIG. 3D, 325-15), another skip branch forms and connects to Concat3 (FIG. 3H, 320-7). Finally, at conv5_1 (FIG. 3E, 325-17) a skip branch forms that connects to Concat2 (FIG. 3F, 320-6).

D. Example Network Structure Embodiments at Training Time

FIGS. 4A-K depict an example network model that may be used at training time, according to embodiments of the present disclosure. It should be noted that the training model comprises a number of similarity with the deployed model illustrated in FIGS. 3A-L and described in the prior section. Accordingly, to avoid unnecessary repetition, this section describes differences in the training network embodiment depicted in FIGS. 4A-K compared to the network embodiment at inference time as shown in FIGS. 3A-L.

Figure 4A:
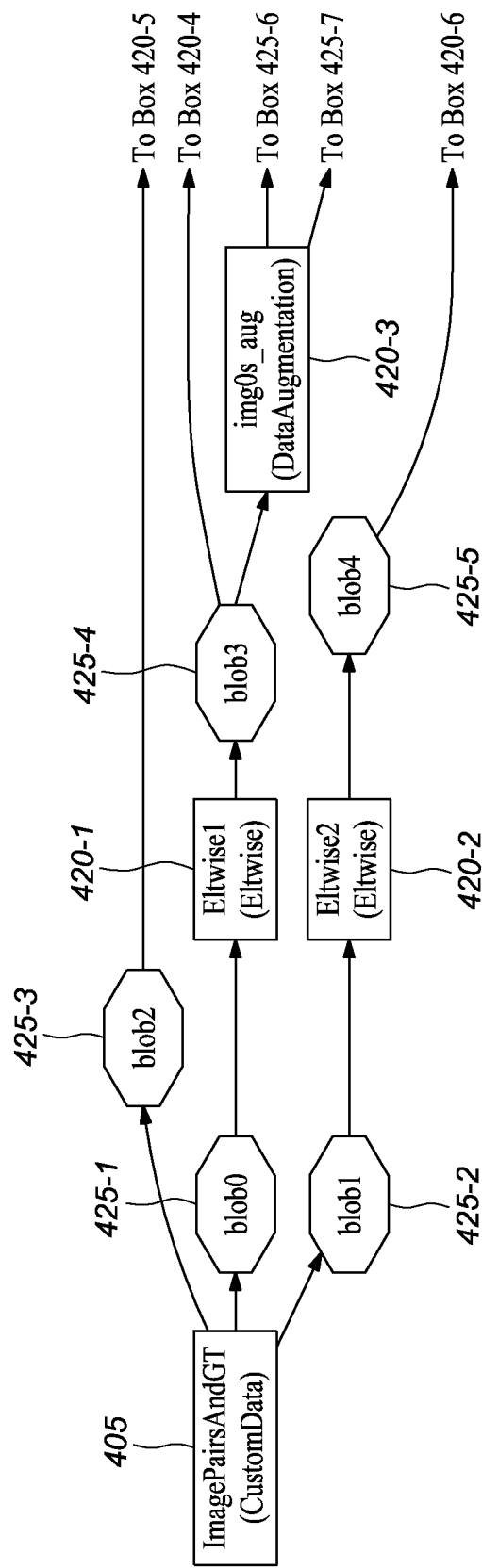
FIGS. 4A-N graphically depict an example deep neural network model that may be used during a training phase, according to embodiments of the present disclosure.
Figure 4B:
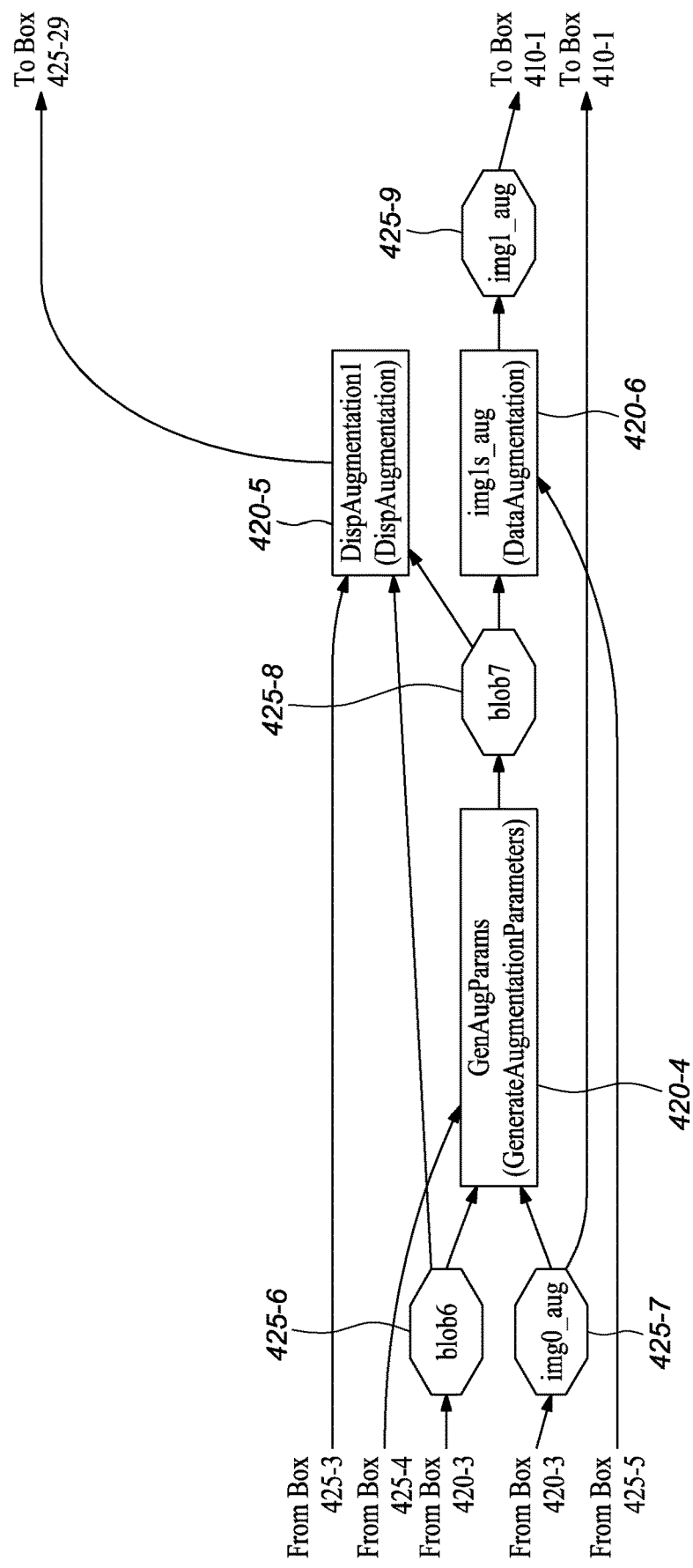
Figure 4C:
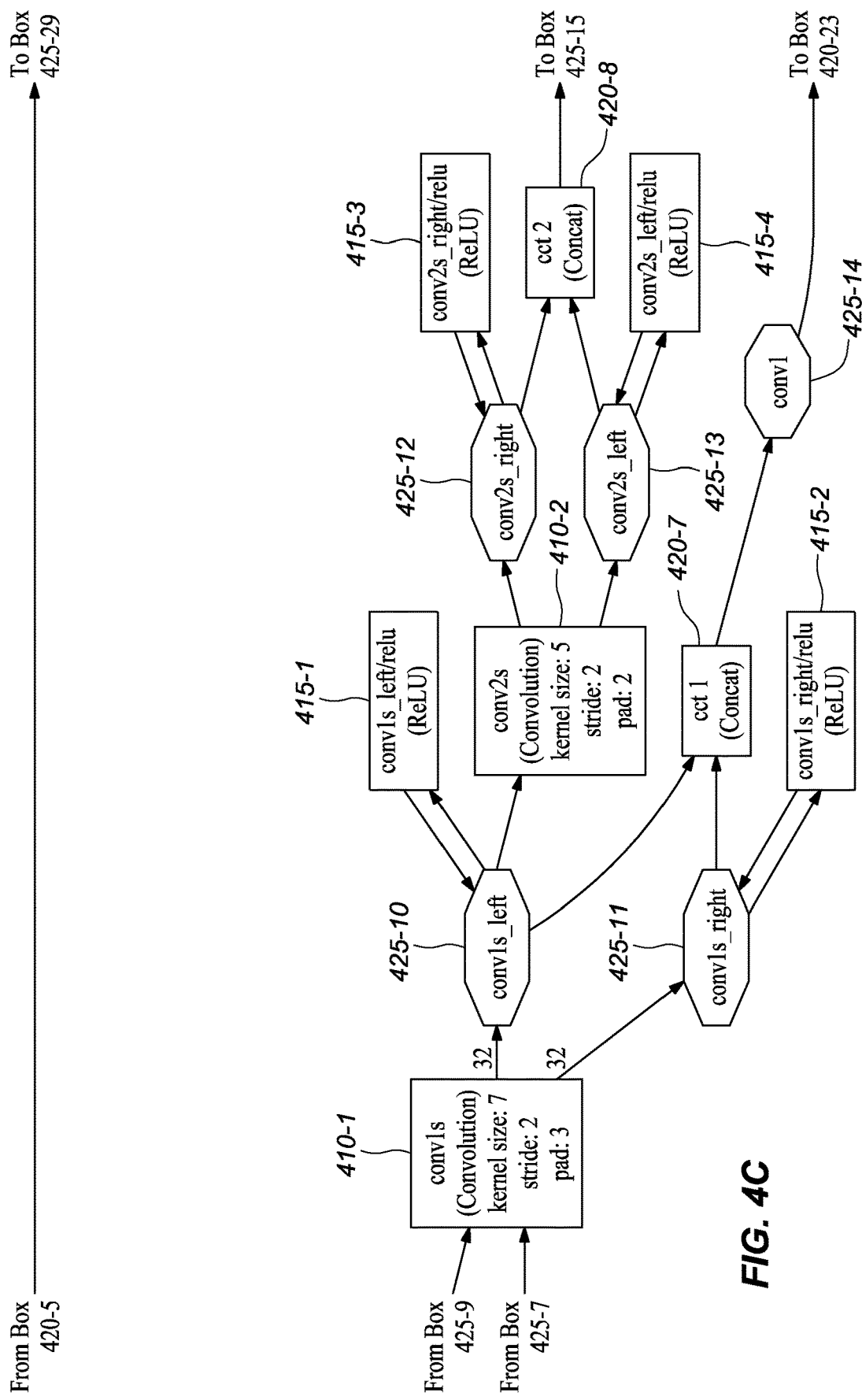
Figure 4D:
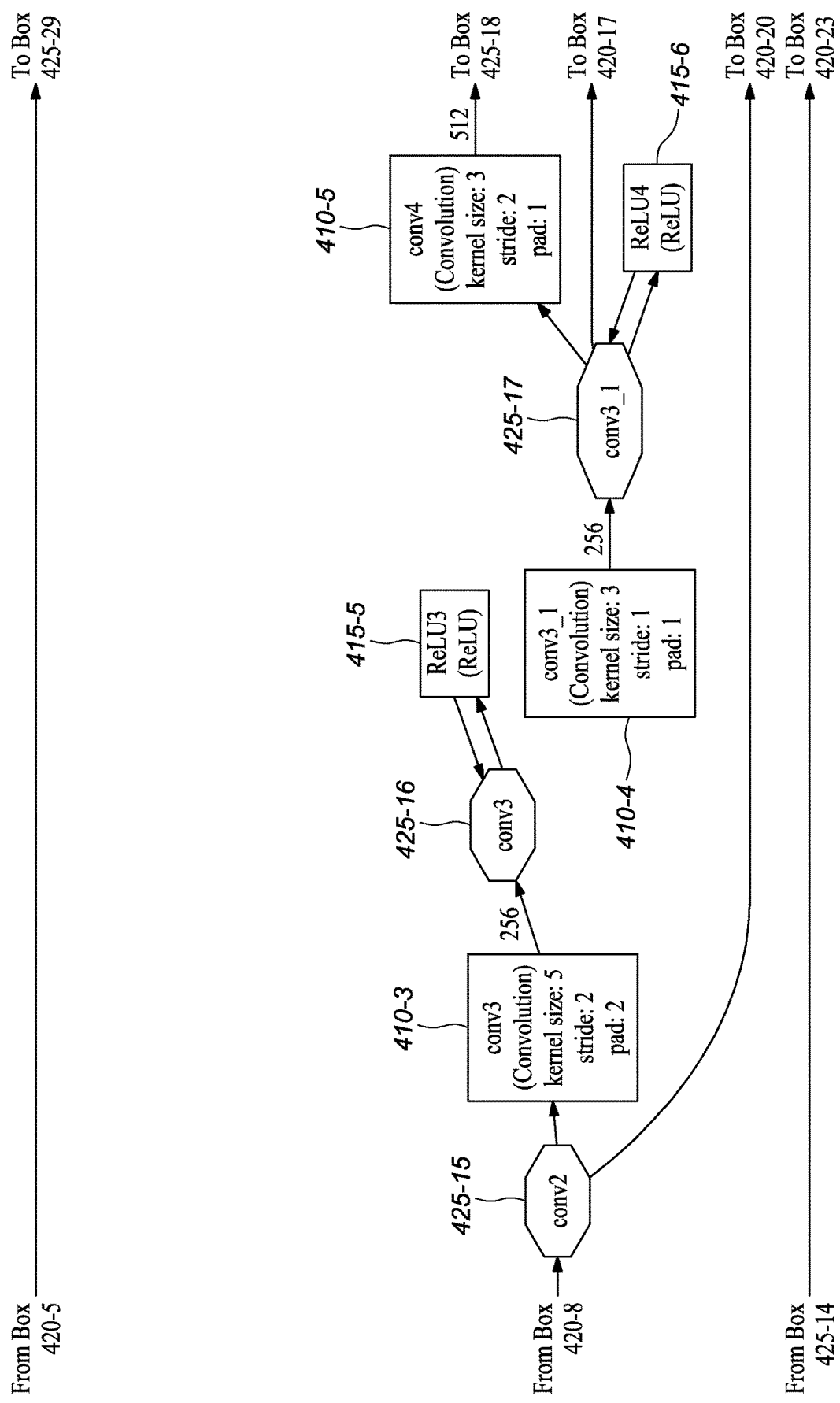
Figure 4E:
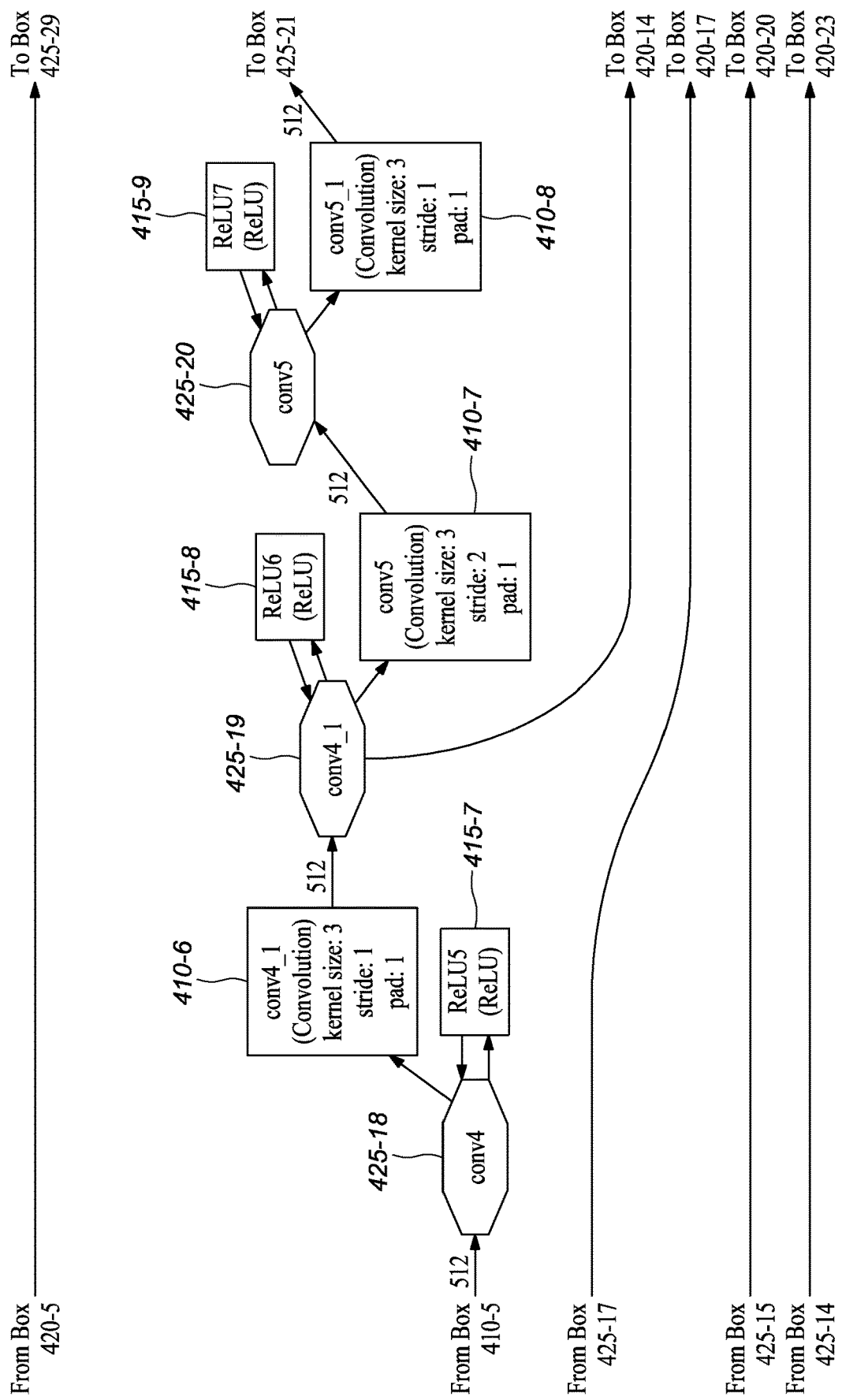
Figure 4F:
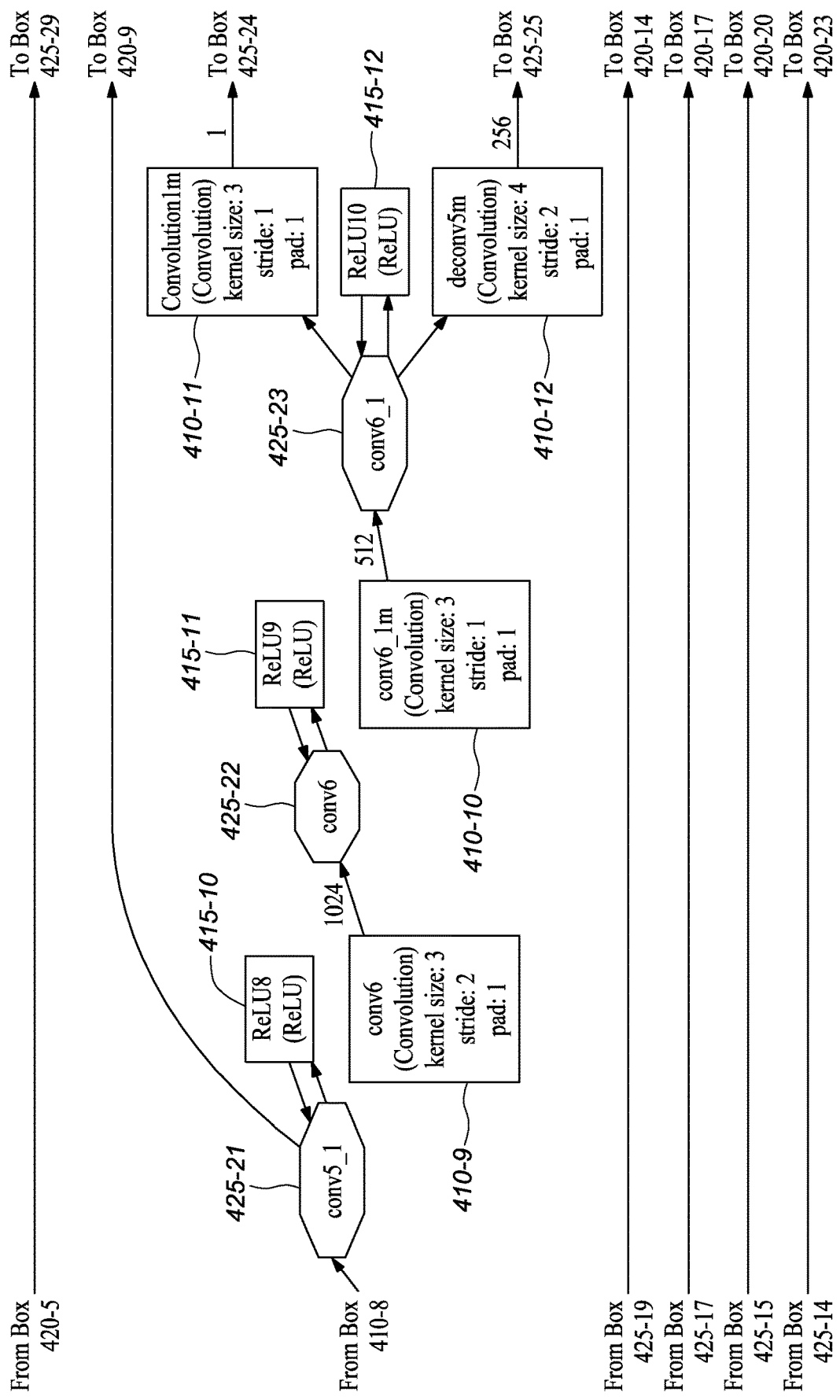
Figure 4G:
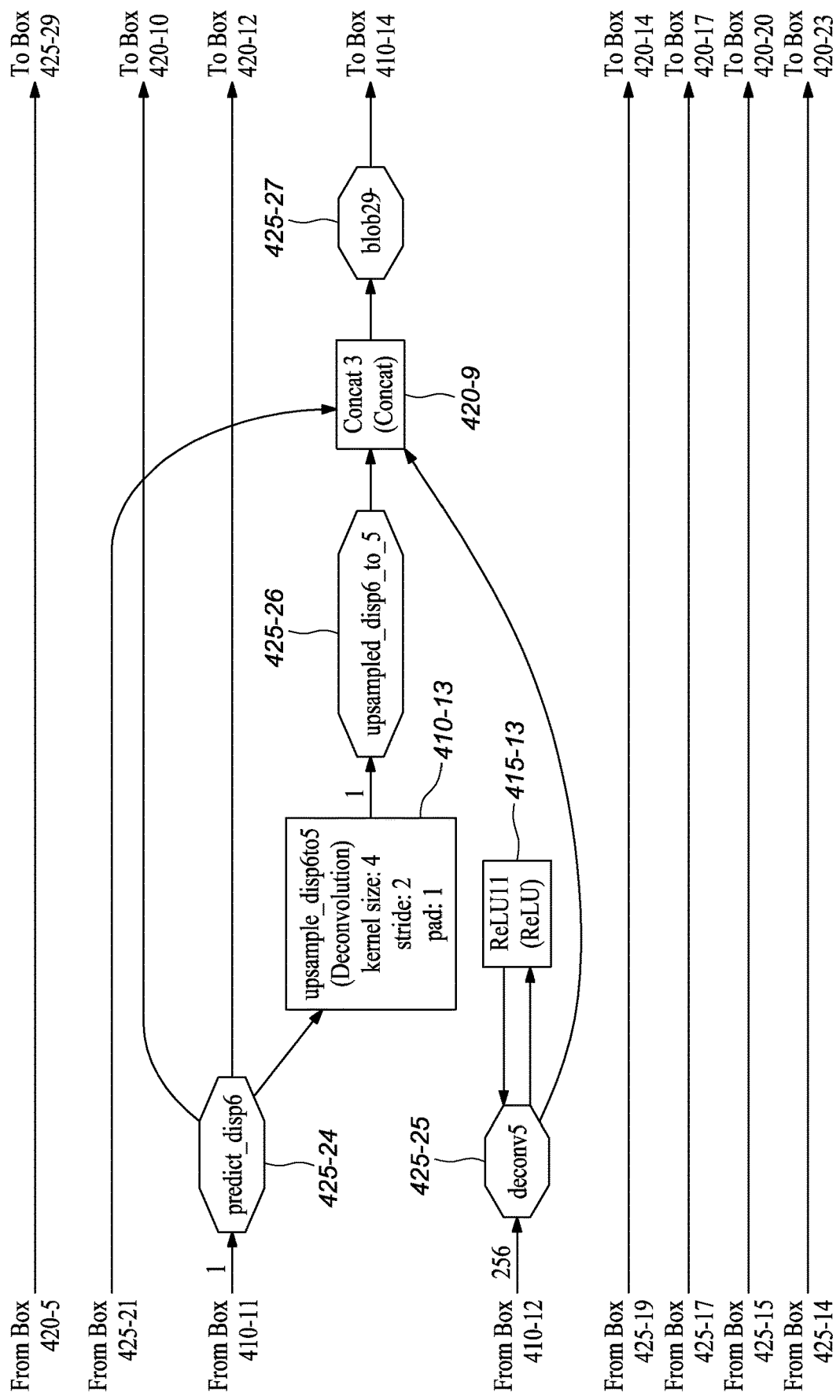
Figure 4H:
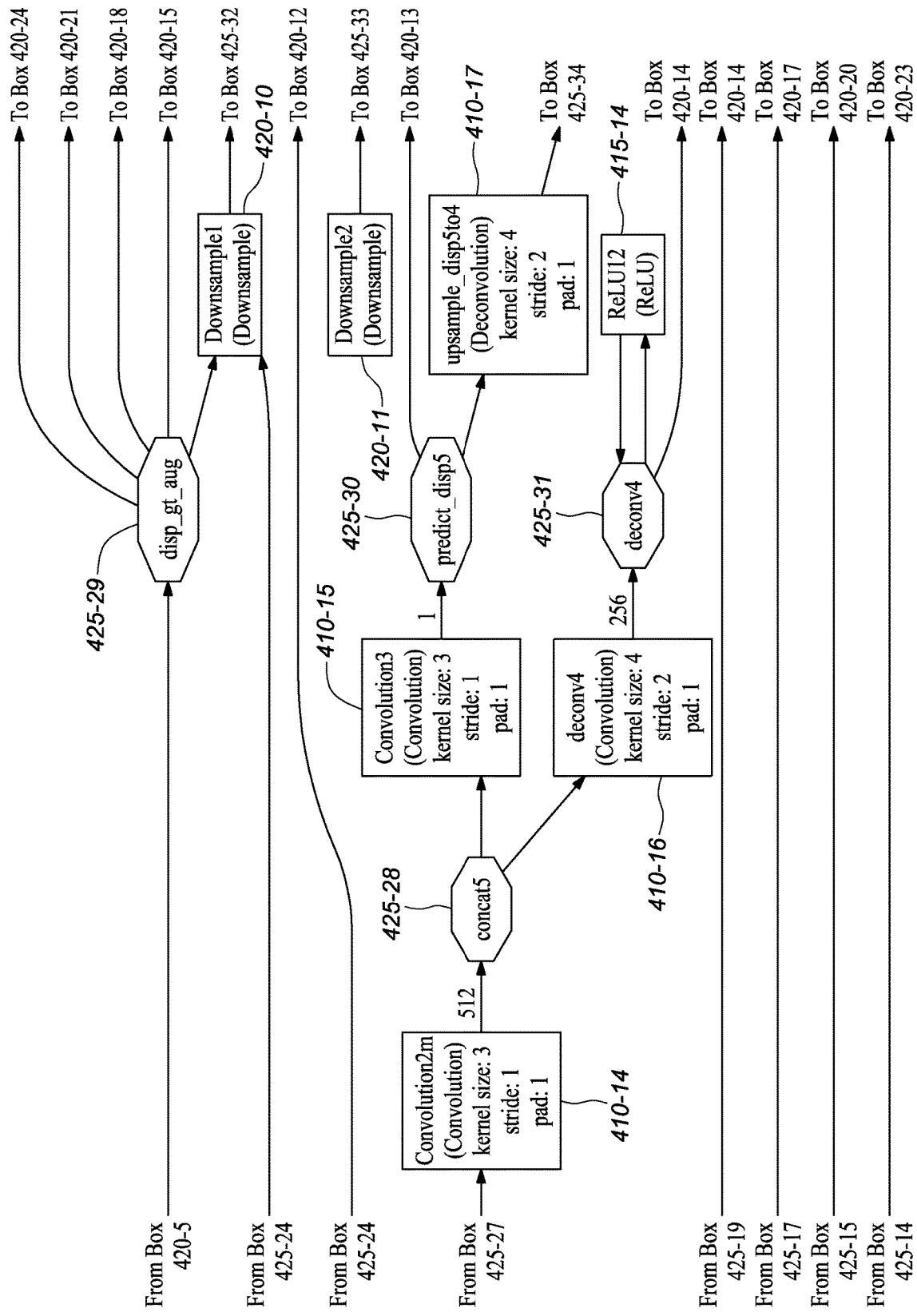
Figure 4I:
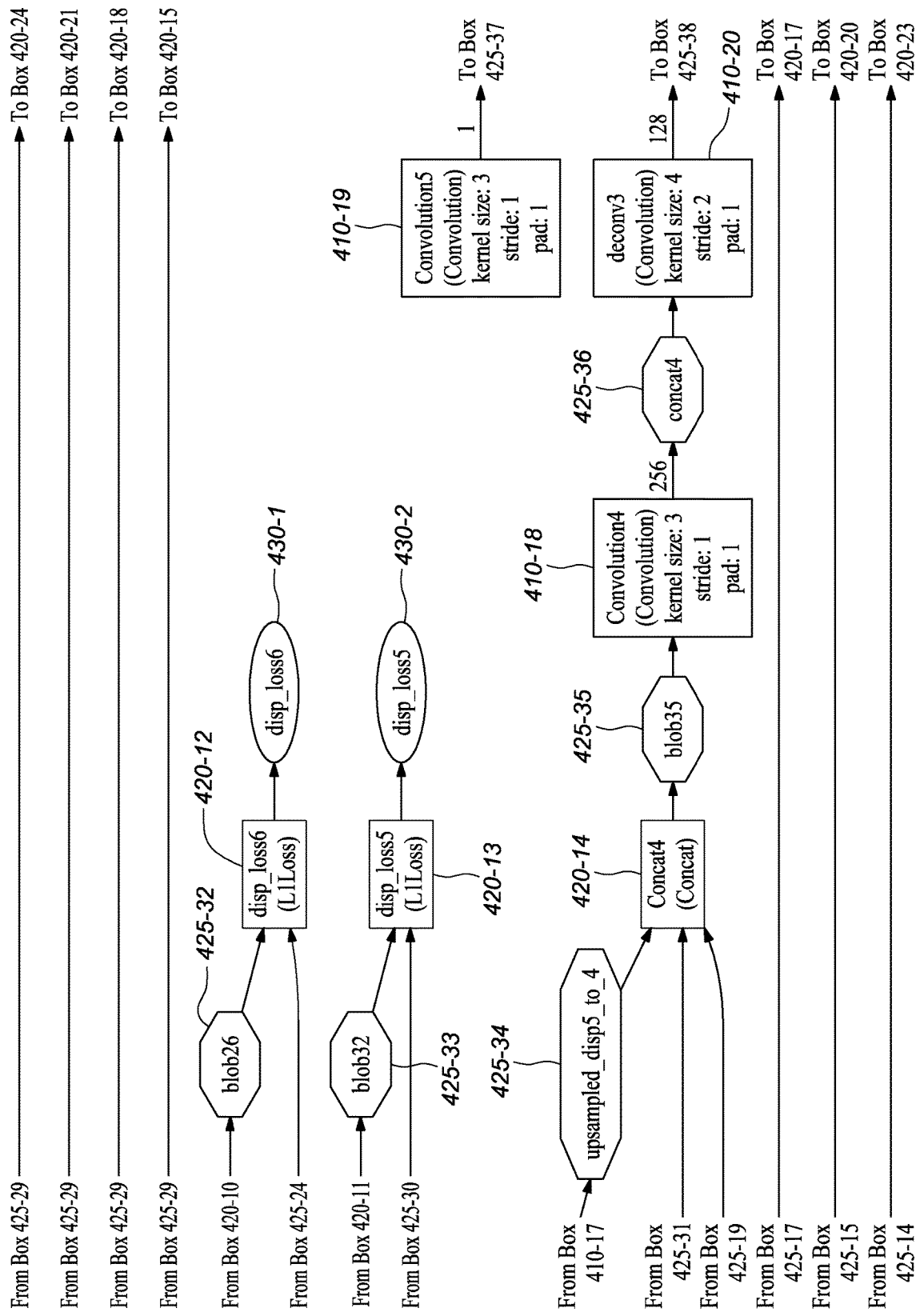
Figure 4J:
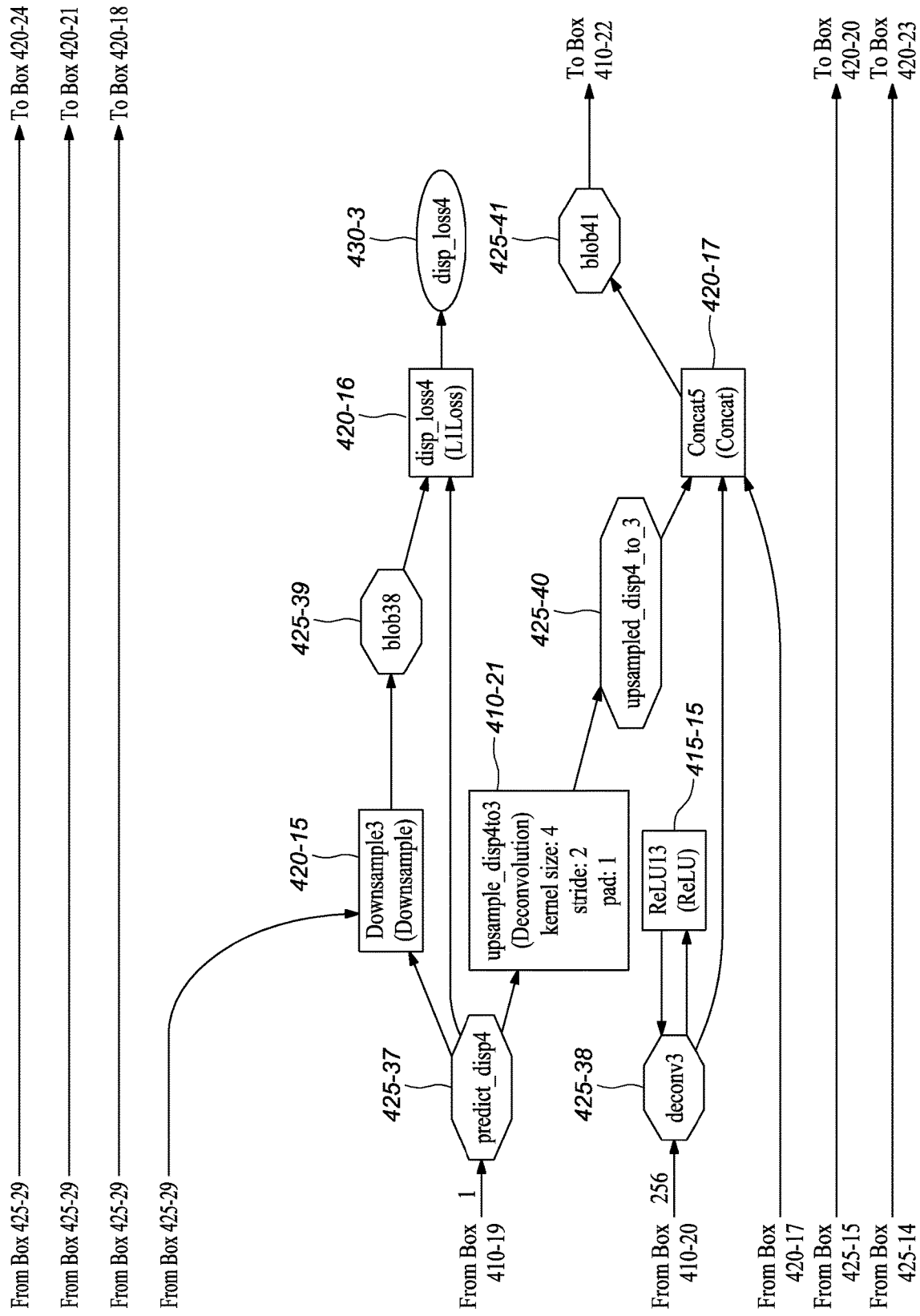
Figure 4K:
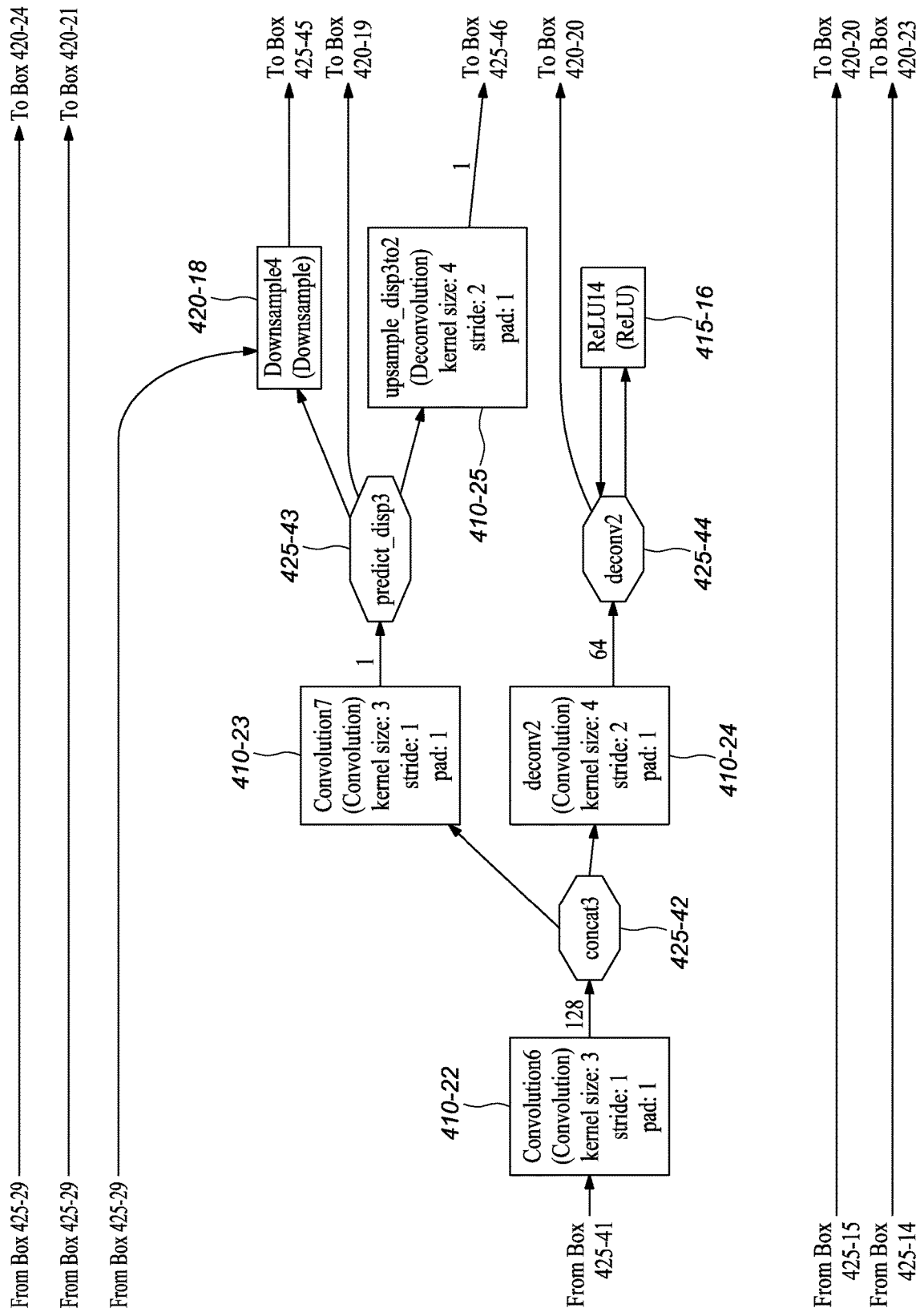
Figure 4L:
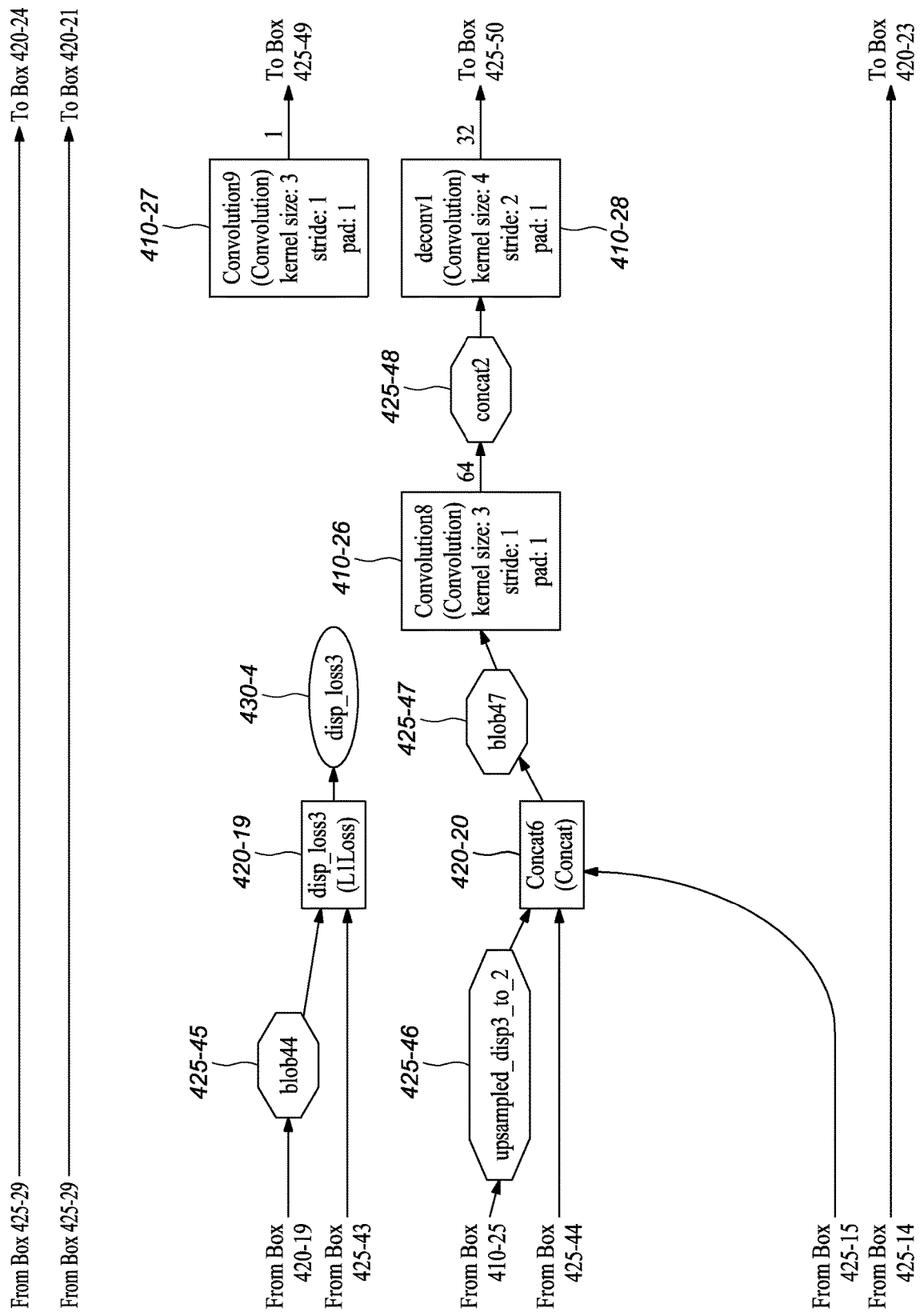
Figure 4M:
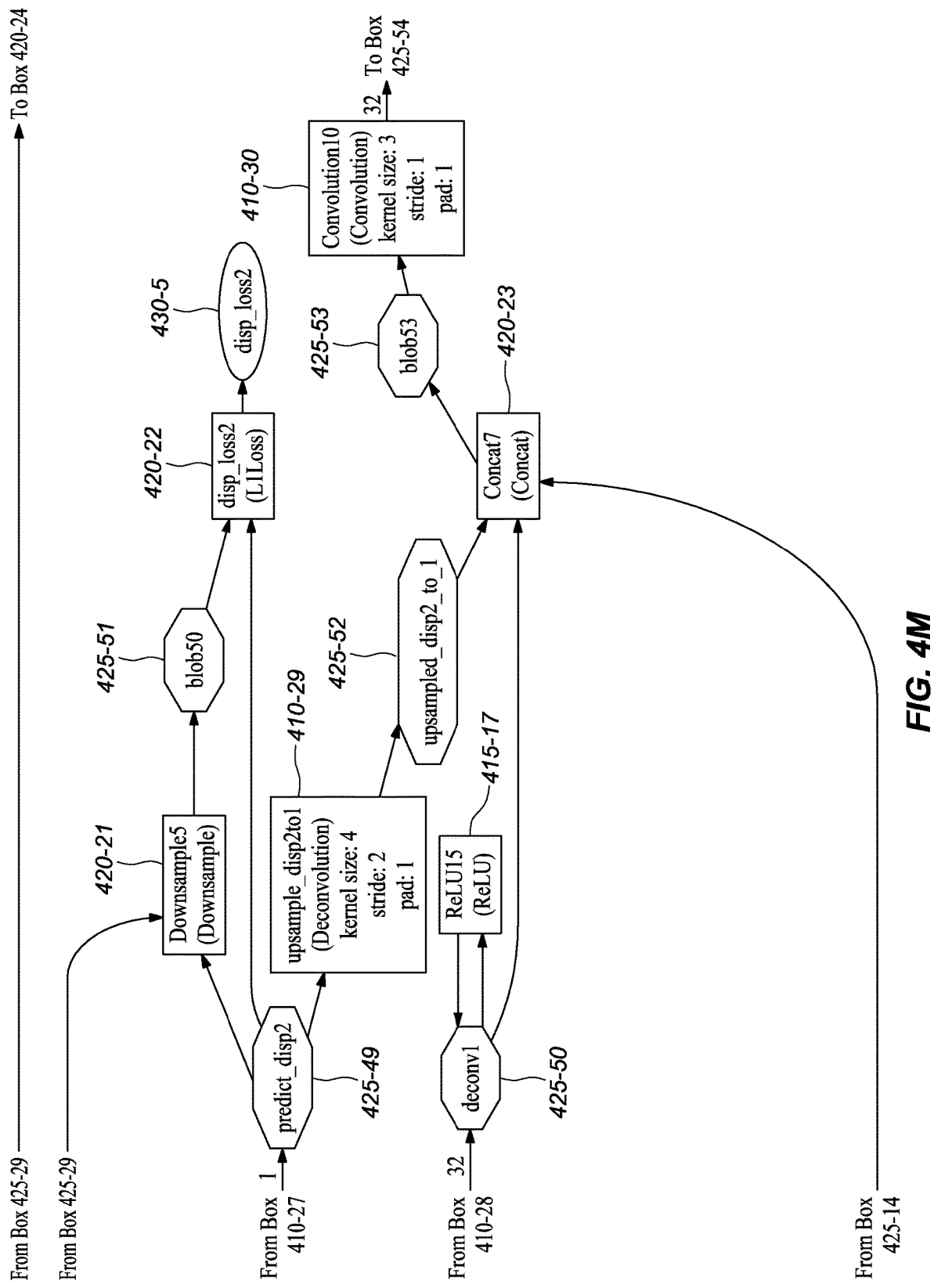

As shown in FIGS. 4A-K, at each training iteration, the network's first layer ImagePairsAndGT (FIG. 4A, 405) takes a pair of training images and a corresponding ground truth (GT) disparity map as input. In one or more embodiments, data augmentation is performed on the image pair through the layers img0s_aug (FIG. 4A, 420-3), GenAugParams (FIG. 4B, 420-4), and img1s_aug (FIG. 4B, 420-6), while a corresponding augmentation is performed on the disparity ground truth through layer DispAugmentation1 (FIG. 4B, 420-5). In one or more embodiments, these data augmentation layers randomly generate and apply image transforms, including translation, rotation, and color change, to the image pairs. In one or more embodiments, the augmented images are input to a convolution, conv1s (FIG. 4B, 410-1) separately, just as at inference.

Figure 4N:
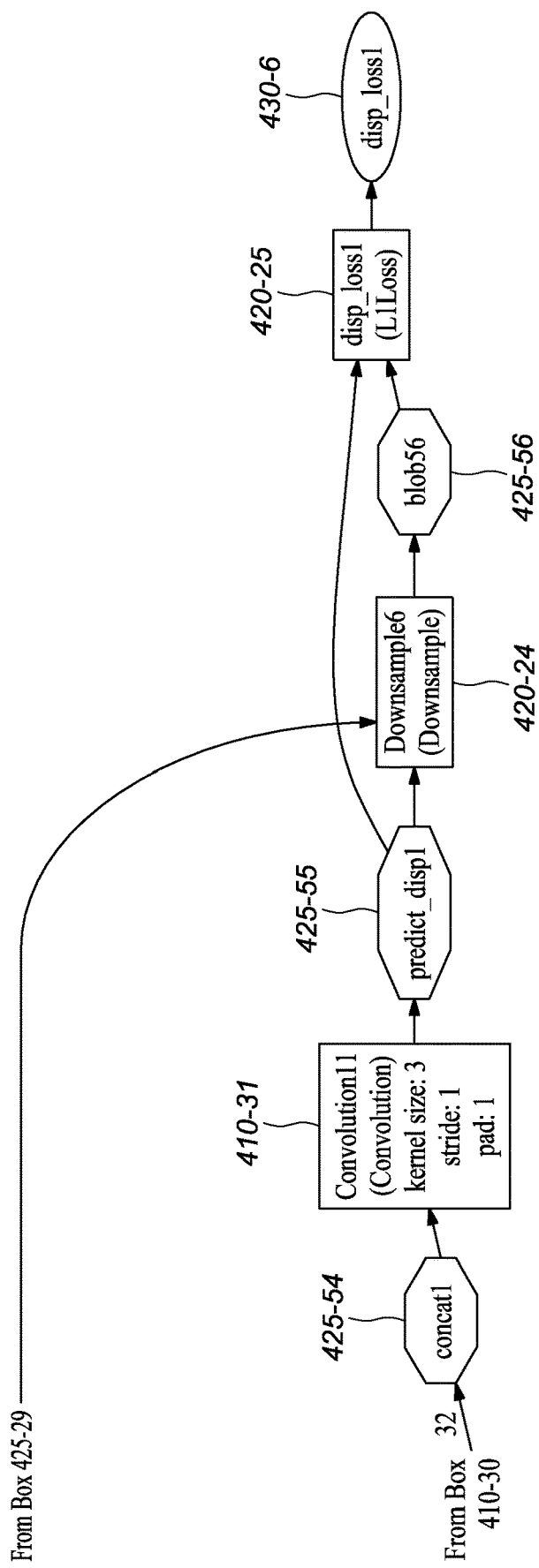
Figure 5:
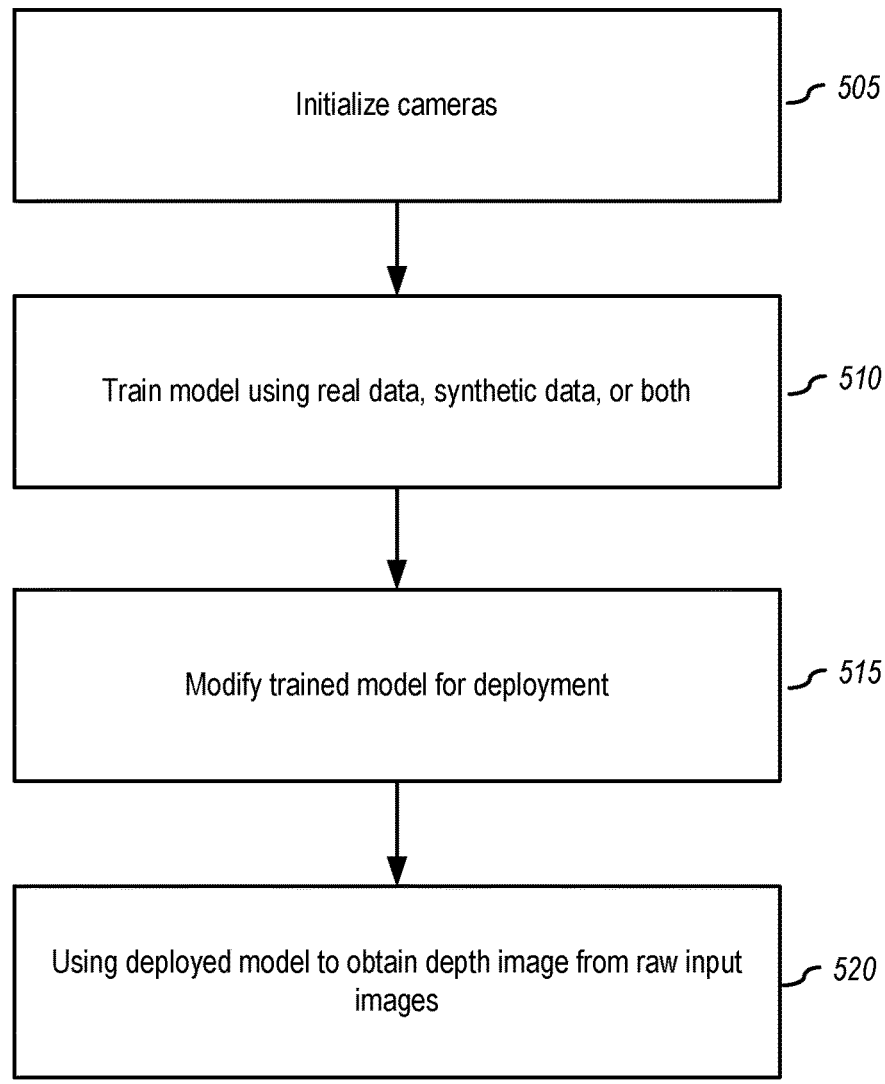
FIG. 5 depicts a general overall method for training and using a neural network model for depth map estimation, according to embodiments of the present invention.

In one or more embodiments, the augmented ground truth disparity map from layer DispAugmentation1 (FIG. 4B, 420-5) goes through multiple downsampling layers separately, including Downsample1 (FIG. 4H, 420-11), Downsample2 (FIG. 4H, 420-10), Downsample3 (FIG. 4J, 420-15), Downsample4 (FIG. 4K, 420-18), Downsample5 (FIG. 4M, 420-21), and Downsample6 (FIG. 4N, 420-24). In one or more embodiments, each connects, directly or indirectly, to a loss layer, such as disp_loss6 (FIG. 4I, 420-12), disp_loss5 (FIG. 4I, 420-13), disp_loss4 (FIG. 4J, 420-16), disp_loss3 (FIG. 4L, 420-19), disp_loss2 (FIG. 4M, 420-22), and disp_loss1 (FIG. 4N, 420-25), together with an auxiliary prediction layer (including Convolution1m (FIG. 4F, 410-11), Convolution3 (FIG. 4H, 410-15), Convolution5 (FIG. 4I, 410-19), Convolution7 (FIG. 4K, 410-23), Convolution9 (FIG. 4L, 410-27)) or the final disparity prediction layer (Convolution11 (FIG. 4N, 410-31)), to compute the loss of auxiliary predictions from the branches or the final disparity prediction, which branches were described with reference to the inference network structure in FIGS. 3A-K. These layers are referred to as auxiliary predictions because they predict the disparity in the middle of the network to help backpropagate the loss to early layers during training, which helps speed convergence.

It should be noted that the network at training time comprises more layers, including data augmentation layers and sampling layers, that may be deliberately removed from a deployed network embodiment. It was found that removal of these layers had little effect on the final performance of the network in inferring depth but had a substantial reduction in processing requirements. These reductions in processing are, at least in part, one of the reasons that the deployed network may be implemented using a hardware accelerator unit, like an FPGA. Also, by reducing the computation requirements, the depth inference can be done in real-time (or near real-time).

E. Example Layer Configurations

It should be note that the figures of a deployed, or trained, network model embodiment (FIGS. 3A-M) and a network model embodiment during training (FIGS. 4A-N), provide graphical and text descriptions of the model components/layers and their associated parameters. However, for convenience, Table 1 depicts information related to some of the layers of the illustrated deep neural network embodiments.

TABLE 1

Example Parameters for Certain Layers in the Network Embodiments

| Name | Kernel Size | Stride | Input Channel Number | Output Channel Number | Input layer |
|---|---|---|---|---|---|
| conv1s | 7 | 2 | 3 | 32 | image |
| conv2s | 5 | 2 | 32 | 64 | conv1s |
| conv3 | 5 | 2 | 128 | 256 | conv2s |
| conv3_1 | 3 | 1 | 256 | 256 | conv3 |
| conv4 | 3 | 2 | 256 | 512 | conv3_1 |
| conv4_1 | 3 | 1 | 512 | 512 | conv4 |
| conv5 | 3 | 2 | 512 | 512 | conv4_1 |
| conv5_1 | 3 | 1 | 512 | 512 | conv5 |
| conv6 | 3 | 2 | 512 | 1024 | conv5_1 |
| conv6_1m | 3 | 1 | 1024 | 512 | conv6 |
| Convolution1m | 3 | 1 | 512 | 1 | conv6_1m |
| upsample_disp6to5 | 4 | 2 | 1 | 1 | Convolution1m |
| deconv5m | 4 | 2 | 512 | 256 | conv6_1m |
| Convolution2m | 3 | 1 | 769 | 512 | conv5_1, upsample_disp6to5, deconv5m |
| Convolution3 | 3 | 1 | 512 | 1 | Convolution2m |
| upsample_disp5to4 | 4 | 2 | 1 | 1 | Convolution3 |
| deconv4 | 4 | 2 | 512 | 256 | Convolution2m |
| Convolution4 | 3 | 1 | 769 | 256 | conv4_1, upsample_disp5to4, deconv4 |
| Convolution5 | 3 | 1 | 256 | 1 | Convolution4 |
| upsample_disp4to3 | 4 | 2 | 1 | 1 | Convolution5 |
| deconv3 | 4 | 2 | 256 | 128 | Convolution4 |
| Convolution6 | 3 | 1 | 385 | 128 | conv3_1, upsample_disp4to3, deconv3 |
| Convolution7 | 3 | 1 | 128 | 1 | Convolution6 |
| upsample_disp3to2 | 4 | 2 | 1 | 1 | Convolution7 |
| deconv2 | 4 | 2 | 128 | 64 | Convolution6 |
| Convolution8 | 3 | 1 | 193 | 64 | conv2s, upsample_disp3to2, deconv2 |
| Convolution9 | 3 | 1 | 64 | 1 | Convolution8 |
| upsample_disp2to1 | 4 | 2 | 1 | 1 | Convolution9 |

TABLE 1-continued

Example Parameters for Certain Layers in the Network Embodiments

| Name | Kernel Size | Stride | Input Channel Number | Output Channel Number | Input layer |
|---|---|---|---|---|---|
| deconv1 | 4 | 2 | 64 | 32 | Convolution8 |
| Convolution10 | 3 | 1 | 97 | 32 | conv1s, upsample_disp2to1, deconv1 |
| Convolution11 | 3 | 1 | 32 | 1 | Convolution10 |

One skilled the art shall recognize that these parameters are provide by way of example and that one or more of these parameters may be changed without departing from the spirit and scope of the present disclosure.

F. Method Embodiments

1. General Overall Method Embodiments

FIG. 5 depicts a general overall method for training and using a neural network model for depth map estimation, according to embodiments of the present invention.

a) Initialization

As illustrated in the depicted embodiment, a camera system, such as cameras 105A and 105B in FIG. 1, may need to be initialized (505). Initializing the camera helps to set proper exposure and gain parameters for the cameras, and may also involve calibration of the cameras. At least two methods may be used. A first method comprises using pre-known parameters. Alternatively, a second method may be used that comprises collecting a few sample images with a set of fixed parameters and calculating camera parameters based on the sample images. Camera initialization/calibration is well known in the art and no particular method is critical to the present disclosure.

b) Training a Deep Neural Network Model

Next, the neural network model may be trained (510). It should be noted that the model may be trained using real data (i.e., captured images with corresponding ground truth depth information/disparity maps), using synthetic data (i.e., computer-generated images with corresponding ground truth depth information/disparity maps), or both.

In one or more embodiments, the neural network (such as the neural network model depicted in FIGS. 4A-N) is trained (515) using both synthetic data and real data. Synthetic training data may be generated from synthetic scenes of three-dimensional (3D) object models. To generate training data, 3D object models may be placed within a virtual space and a binocular camera at random poses may be simulated to obtain pairs of images and corresponding disparity maps. Real data may be collected from depth sensing devices, such as Red-Green-Blue-Depth (RGBD) cameras or Light Detection and Ranging (LIDAR) camera systems.

FIG. 6 depicts an example method for training a deep neural network model for depth estimation according to embodiments of the present disclosure. It shall be noted that the embodiment depicted in FIG. 6 contemplates training the neural network using computationally capable workstations but deploying the trained neural network using hardware accelerator component that may not be as computationally capable as the workstation but is efficient and inexpensive.

In the depict embodiment, an initial training set of data may be used (605) to train the neural network in a floating-point mode using one or more workstations, preferably with a graphical processor unit or units (GPUs) to aid in the heavy computation requirements of training. In one or more embodiments, the initial training set of data may be synthetic training data (i.e., computer-generated images with corresponding disparity maps).

After the floating-point-mode network converges on the synthetic training data, additional training may be performed (610) using as second set of training data. In one or more embodiments, the second set of training data may be real images along with their corresponding disparity map as ground truth to fine-tune the network on real data to improve the performance on real environment.

In embodiment, different bit representations may be used to fine-tune the model to better align it for its deployment if deployed using a hardware accelerator component that uses a different bit representation for computation than used by the training workstation. In one or more embodiments, assuming an 8-bit fixed value representation is used by the hardware accelerator unit, 8-bit trained fine-tuning may be performed (615) on the above-mentioned floating-point network in 8-bit mode to produce an 8-bit network, in which network parameters are quantized to 8-bit representation.

FIG. 7 depicts a method for fine-tuning, as part of training, a floating-point neural network model by simulating a certain bit representation to produce a neural network for use on a hardware accelerator component that uses that certain bit representation, according to embodiments of the present disclosure. Assume, for purposes of illustration, that the workstation uses a 32-bit floating-point representation for values and that the hardware accelerator is an FPGA that uses 8-bit fixed-point representation for operation computations, although other representations and implementations may be used. As shown in FIG. 7, during each layer's computation, the image-related input data (e.g., data that is input image data or derived from the input image data by, for example, having undergone one or more prior operations) for a network operation may be converted (705) from 32-bit floating-point values to 8-bit fixed value representation. Similarly, the operation parameter data (e.g., the weights for a layer) may be converted (710) from 32-bit floating-point values to 8-bit fixed-point values. In one or more embodiments, these 8-bit fixed representations of the values for the input data and the operation parameter data are dequantized (715) to 32-bit floating-point values. Then, in one or more embodiments, the neural network operation or operations (e.g., the layer operation, such as convolution, deconvolution, etc.) are performed (720) using the dequantized 32-bit floating-point representation of the values, and the results data of the operation or operations may be output (725) as 32-bit floating-point values. It should be noted that the conversions and dequantizations may involve conversion to one or more intermediate bit representations.

An alternative embodiment of this methodology is graphically illustrated in FIG. 8. As shown in FIG. 8, the image-relate input data 802 may be converted (805) from 32-bit floating-point representation of values to 18-bit floating-point representation of values. In embodiments, this process may be handled automatically by the hardware accelerator when the CPU initiates the request/command of writing the data to the memory (e.g., double data rate random access memory (DDR RAM)) of the hardware accelerator component. It should be noted that the layer parameter data is fixed or relatively fixed and can be stored in 8-bit integers in memory. In contrast, the input data for each layer changes and has different ranges; thus, the input data is not directly represented in 8-bit in memory. In embodiments, float values are used for this data and to save space and time, shorter float values may be used in memory. In this depicted embodiment, 18-bit floating point is used but other sizes, like 16-bit floating point could also be used. As illustrated, to perform the layer operation or operations computation, the 18-bit floating-point values may be converted (810) to 8-bit integers on the fly using a conversion, such as the ABSMAX methodology (described below) each time. The remainder of the depicted embodiment in FIG. 8 proceeds in like manner as that described in FIG. 7. It should be noted that alternative methods may comprise fewer or more bit representation conversions.

Concerning the conversion of floating-point bit representation used by the processor unit to a fixed-bit representation used by the hardware accelerator unit, FIG. 9 graphically depicts a method for quantizing values represented in one bit representation scheme into a different bit representation scheme, according to embodiments of the present disclosure. In the graphical depiction, the top line 905 represents a first bit representation scheme, which is 32-bit floating-point representation in this example but may be a different representation, and the bottom line 910 represents a second bit representation scheme, which is 8-bit floating-point representation in this example but may be a different representation. In one or more embodiments, the conversion between the different representation schemes of image-related input data, of a layer's parameter data, or of other data (each of which may be generically referred to below as "Blob" data), may be converted as follows:

$$\text{Blob}_{Fix8} = \text{Blob}_{FP32}/\text{ABSMAX}*127 \quad (1)$$

$$\text{Blob}_{FP32} = \text{Blob}_{Fix8}/127*\text{ABSMAX} \quad (2)$$

where ABSMAX is the maximum of the absolute values of the data array (e.g., in the image-related data ("Image"), or in a filter array ("Filter")).

By way of example, an operation, such as a convolution, using the quantized data may be performed as follows:

$$\text{Conv}(\text{Blob}_{FP32}^{Image}, \text{Blob}_{FP32}^{Filter}) = (\text{ABSMAX}^{Image}*\text{ABSMAX}^{Filter})/(127*127) \\ *\text{Conv}(\text{Blob}_{Fix8}^{Image}, \text{Blob}_{Fix8}^{Filter}) \quad (3)$$

where $\text{ABSMAX}^{Image}$ is the absolute maximum value in the image-related data and $\text{ABSMAX}^{Filter}$ is the absolute maximum value in the operation filter's parameters. One skilled in the art shall recognize that other conversion operations may be performed.

c) Modifications to Neural Network Model

Returning to FIGS. 5 and 6, the neural network model after training may be modified (515/620) for deployment to help reduce computation costs. In one or more embodiments, it was found that by removing data augmentation layers, sampling layers, or both, that the trained model still performed well but required less computation time and expense. Thus, one or more of these layers may be removed for the deployed trained network; an example of which can be seen by comparing the neural network model embodiment of FIG. 4A-N that is used in training and the deployed neural network model embodiment of FIG. 3A-M.

It shall be noted that the neural network model may have other modifications from typical models. In one or more embodiments, these changes may be made from the outset to the neural network model.

In one or more embodiments, at least two early stage convolution operations in the neural network model may be configured to each operate separately on image-related data corresponding the first image and the second image instead of operating on a set of data representing a combination of the image-related data. For example, as illustrated in FIGS. 3 and 4, the two convolutions, convol1s (310-1 in FIG. 3A/410-1 in FIG. 4C) and convol2s (310-2 in FIG. 3B/410-2 in FIG. 4C) each operate on data corresponding to the two input images separately and then concatenate the results instead of each operating on a stack of data related to the two input images. Operating on a stack, which is double the size, requires the convolutions to be much larger, which increase memory and computation requirements. Furthermore, in one or more embodiments, these convolution operations may share parameters. Since these are early stage convolutions, they are operating on low level features of the images, which makes parameter sharing more appropriate. Later stage operations operate at higher levels features where differences have more significance, and therefore, parameter sharing would be less appropriate. Also, in embodiments, for high layers, the features from both left and right side are mixed to find correspondence and disparity; thus, the features from the left and right images may not be separated throughout the model. Thus, there is not sharing of parameters for higher layers because the parameters are for both images combined.

In yet other embodiments, certain operations may reduce the number of channels to help reduce computation. For example, in one or more embodiments, a deconvolution operation deconv5m (310-11 in FIG. 3E/410-12 in FIG. 4F) and a convolution operation Conv6_1m (310-10 in FIG. 3E/410-10 in FIG. 4F) may each reduce the number of channels by half. This reduction greatly eases the computation and memory burdens on the hardware acceleration unit but has very little negative effect on output performance of the trained model.

Unlike typical depth neural networks, embodiments of the neural network model may employ a simple rectified linear unit (ReLU), rather than more complex ones such as leaky ReLU or noisy ReLU. An example ReLU function that may be employed is:

$$f(x) = \begin{cases} x, & x \geq 0 \\ 0, & x < 0 \end{cases}.$$

Again, the simple ReLU reduces computation costs but does not severely affect the neural network's overall performance.

Returning to FIG. 5, once the network has been trained and modified, it may be deployed (520) to obtain depth information, such as a disparity map or depth map, given stereo images as input.

2. Using the Deployed Trained Neural Network Model for Depth Estimation a) General Deployed Method Embodiments

FIG. 10 depicts a method for using a trained neural network model with a hardware acceleration unit to provide dense depth map information in real-time (or near real-time), according to embodiments of the present disclosure. In one or more embodiments, a depth map estimation system, like one depicted in FIG. 1, is used to capture (1005) a set of stereo images of a scene. The images represent two views of a scene. In one or more embodiments, the images may be captured by having the CPU sends a signal to the microcontroller that it is expecting a new pair of stereo image. The microcontroller may then cause the two cameras to contemporaneously capture images. After the exposure is done, the image data may be transmitted from the cameras to the CPU via microcontroller. For example, if the camera has a resolution of 640×480, the CPU receives 640×480×2×8 bytes of data—if the cameras are gray, or 640×480×2×3×8 bytes of data—if the cameras are color. As previously noted, the system may not include a microcontroller and its functions may be performed by a CPU. It should be noted that the depict method embodiment does not include an initialization/calibration phase; however, if initialization/calibration is desired, it may be performed in like manner as previously described, above.

In one or more embodiments, the input images data may then be processed (1010) according to a deployed neural network model, such as one like that depicted in FIG. 3A-M. In one or more embodiments, for each pair of captured images, the CPU and hardware accelerator component cooperate to run the deployed deep neural network. For example, in one or more embodiments, the CPU may control the general workflow, and sequentially assign one or more layers' computation task to the hardware accelerator component. In one or more embodiments, for each layer assigned to the hardware accelerator component, it fetches data and layer parameters from the CPU and/or from memory, performs that layer's computation (e.g., convolution, deconvolution, concatenation, etc.), and returns (1015) the processed data to the CPU and/or memory.

In one or more embodiments, once the final result is obtained, which may be a depth map image or a depth image data and the raw input image data, it is output (1020). This final output data may be stored for later use, transferred via a communication protocol (e.g., Universal Serial Bus (USB), Ethernet, Serial, Parallel, etc.) and/or used by a corresponding system or the same system for ensuing tasks. For example, the depth map information may be used for obstacle detection for an autonomous vehicle.

In one or more embodiments, after the result has been output and/or used, the system may return (1025) to the step of capturing the next pair of stereo images to start a next cycle. This process may be repeated until a stop condition has been reached. A stop condition depends upon the application of the depth map information. In the case of an autonomous vehicle, it may continue so long as the vehicle is in operation. Other stop conditions may include obtaining a set number of depth maps, operating for a certain amount of time, operating until an instruction to stop is received, and the like.

G. Hardware Accelerator Component Quantized Embodiment

Figure 11:
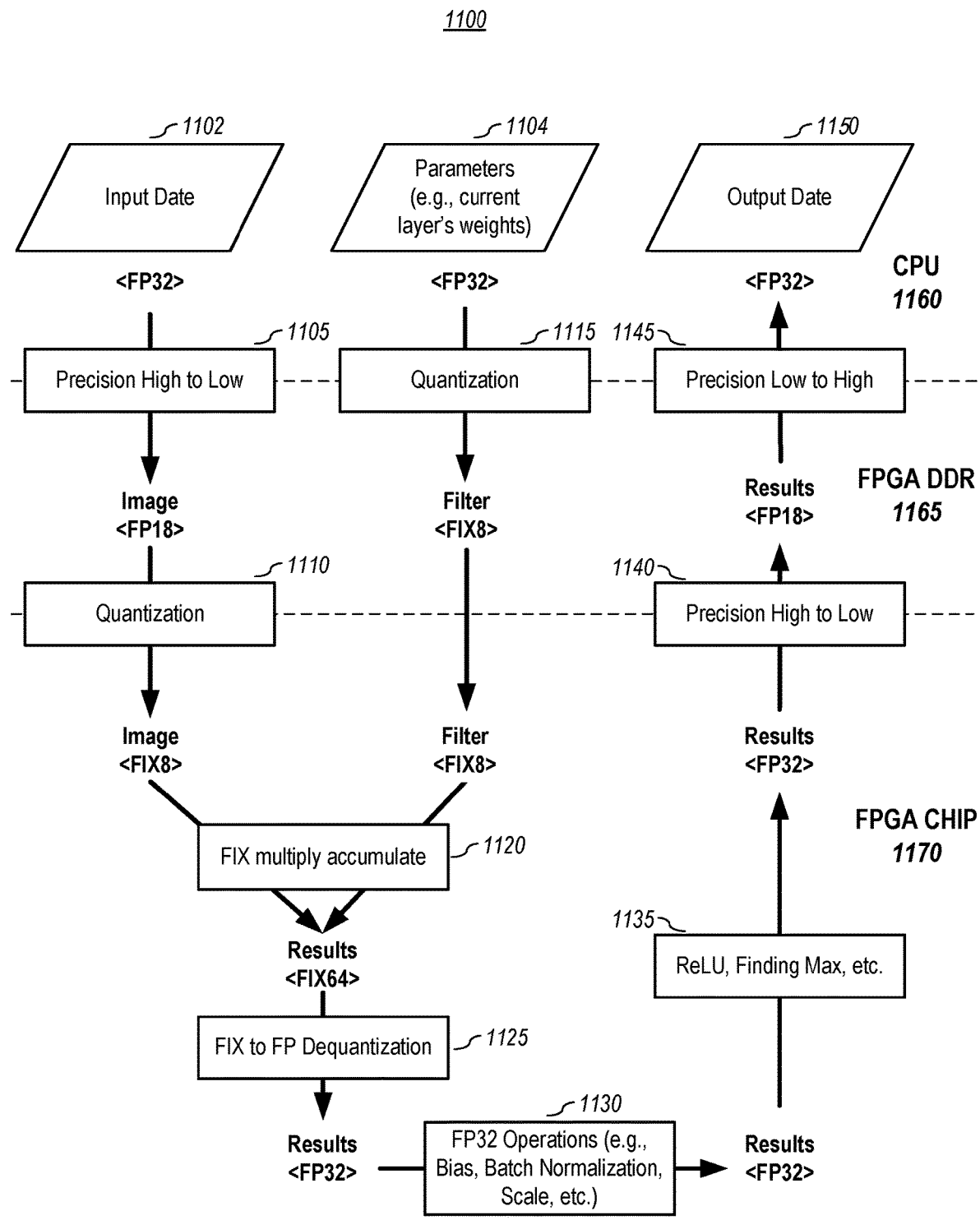
FIG. 11 graphically depicts a method for converting between a processor-related bit representation to a hardware accelerator component bit representation, performs integer computation, and converts the integers back to floating point numbers for the use of next layer, according to embodiments of the present disclosure.

As has been noted previously, the hardware accelerator component may not use the same bit representation scheme that the processor unit (or units) uses. Accordingly, in one or more embodiments, for processes that are handled by the hardware accelerator component, the requisite data (e.g., input data and layer parameters) are converted to the appropriate bit representation. For example, for each of the convolution layers, deconvolution layer, concatenations, etc. handled by the hardware accelerator component, the CPU and/or the hardware accelerator component converts the numbers. FIG. 11 graphically depicts a method for converting between a processor-related bit representation to a hardware accelerator component bit representation, performs integer computation, and converts the integers back to floating point numbers for the use of next layer, according to embodiments of the present disclosure. In the depicted example in FIG. 11, the hardware accelerator is an FPGA, but as previously noted, other components may also be used. Also, it should be noted that the depicted embodiment shows the steps in relation to the components involved, namely the CPU 1160, the FPGA memory 1165, and the FPGA chip 1170; however, the steps may be allocated differently but still fall within the scope of the present disclosure.

Assume, for purposes of illustration of the depict method, that the CPU uses a 32-bit floating-point representation for values and the FPGA hardware accelerator uses 8-bit fixed-point representation for operation computations. As shown in FIG. 11, during a layer's computation, the image-related input data 1102 for an operation may be converted (1105) from a high precision of 32-bit floating-point values to 18-bit floating-point values. This process may be handled automatically by the hardware accelerator when the CPU initiates the request/command of writing the data to the DDR memory 1165 of the FPGA. The values in 18-bit floating-point representation may then be quantized (1110) by the FPGA 1170 to 8-bit fixed representation values. In the depicted embodiment, the operation parameter data (e.g., the weights for a layer) 1104 is directly converted (1115) from 32-bit floating-point values to 8-bit fixed-point values and stored in the FPGA's memory 1165. In embodiments, since at deployment time the layer weights do not change and have fixed range, they can be directly represented in 8-bit in the memory.

In one or more embodiments, when the FPGA performs the layer operation computation, it accesses the input data in its memory and quantizes (1110) it and also accesses the parameters, which are already in an 8-bit fixed representation. The two sets of data may undergo an operation, such as a fixed multiply accumulate operation (1120) to produce results data, which may be in a 64-bit fixed representation. In one or more embodiments, this results data may be dequantized (1125) to a floating-point 32-bit representation.

In one or more embodiments, this results data may be interim or intermediate results data that may undergo one or more additional operations. For example, the data may undergo one or more additional operations (e.g., 1130 and 1135) like scaling, bias, batch normalization, ReLU operations, max pooling, etc.

Once all the operations that the FPGA is to perform for this layer have been completed, the results data is converted (1140) to an 18-bit floating point representation and stored in memory. It should be noted that the 18-bit conversions (1105 and 1140) from the CPU into the FPGA memory and from the FPGA core into the FPGA memory may be skipped if the FPGA memory supports 32-bit floating point memory. Thus, it should be noted that the method may involve fewer or more bit representation conversions.

Finally, the CPU may access the stored values, in which the 18-bit floating point representation of the values may be converted (1145) to 32-bit floating-point values. Depending upon the layer stage, the output results 1150 may be the final results of the neural network, such as a depth map, or may be intermediate results of neural network, in which these results may be used for a subsequent layer. For example, in embodiments, the results after stage 1140 may be the next layer's "image" going into box 1110.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An image processing system comprising:
a processor unit; and
a non-transitory computer-readable medium or media comprising one or more sequences of instructions which, when executed by the processor unit, causes steps to be performed comprising:
receiving a pair of images of a scene, in which the pair of images comprises a first image and a second image;
performing depth map inference using the pair of images and a trained neural network model that comprises a plurality of operations, in which at least some of the operations of the plurality of operations of the trained neural network model are performed by a hardware accelerator component that is communicatively coupled to the processor unit, wherein the trained neural network model was obtained, at least in part, by training a neural network model using a bit representation conversion to simulate use of the hardware accelerator component when the trained neural network model is deployed; and
outputting a depth map comprising distance information to surfaces in the scene; and
a hardware accelerator component configured to perform at least some of the operations of the trained neural network model using a different bit representation than that used by the processor unit.

2. The image processing system of claim 1, wherein the processor unit operates using a floating-point bit representation and the hardware accelerator component uses fewer bits and uses a fixed-bit representation.

3. The image processing system of claim 1, wherein the processor unit controls workflow for performing the depth map inference using the trained neural network model, which comprises assigning at least some of the operations of the plurality of operations of the trained neural network model to the hardware accelerator component, which returns results data that is accessible by the processor unit.

4. The image processing system of claim 1, wherein the step of using a bit representation conversion to simulate use of the hardware accelerator component when the trained neural network model is deployed comprises:
converting input data for the operation from a floating-point bit representation used by the processor unit to a fixed-bit representation used by the hardware accelerator component;
converting operation parameter data for the operation from a floating-point bit representation used by the processor unit to a fixed-bit representation used by the hardware accelerator component;
dequantizing the fixed-bit representation of the input data and the operation parameter data to a floating-point representation;
performing the operation using the dequantized floating-point representation of the input data and the operation parameter data; and
outputting a set of results data from the operation in the dequantized floating-point representation.

5. The image processing system of claim 4, wherein dequantized floating-point value representation is the floating-point bit representation used by the processor unit.

6. The image processing system of claim 3, wherein the neural network model used in training comprises one or more data augmentation layers and one or more sampling layers that are removed when creating the trained neural network model to improve processing time during deployment.

7. The image processing system of claim 1, wherein the trained neural network model reduces computation by comprising two convolution operations in the trained neural network model, in which each operates on image-related data corresponding to the first image and on image-related data corresponding to the second image separately instead of operating on a set of data representing a combination of image-related data corresponding to the first and second images, and the two convolution operations share parameters.

8. The image processing system of claim 1, wherein the hardware accelerator component performs at least some of the operations of the trained neural network model using a different bit representation than that used by the processor unit by performing the steps comprising:
converting input data for the operation from a floating-point bit representation used by the processor unit to a fixed-bit representation used by the hardware accelerator component;
converting operation parameter data for the operation from a floating-point bit representation used by the processor unit to a fixed-bit representation used by the hardware accelerator component;
performing the operation at the hardware accelerator component using the fixed-bit representation of the input data and the operation parameter data to obtain results data; and
dequantizing the fixed-bit representation of the results data to a floating-point representation.

9. The image processing system of claim 8, wherein the results data is interim results data and the image processing system further performs the steps comprising:
performing, using the hardware accelerator component, one or more operations on the dequantized fixed-bit representation of the interim results data before submitting results data to the processor unit.

10. An image processing system comprising:
a processor unit;

a non-transitory computer-readable medium or media comprising one or more sequences of instructions which, when executed by the processor unit, causes steps to be performed comprising:
  receiving a pair of images of a scene, in which the pair of images comprises a first image and a second image;
  performing depth map inference using the pair of images and a trained neural network model that comprises a plurality of operations, including a plurality of convolutions and deconvolutions, and that has been configured to reduce computation requirements by:
    comprising at least two convolution operations, in which each convolution operates on image-related data corresponding to the first image and on image-related data corresponding to the second image separately instead of operating on a combination of the image-related data corresponding to the first image and the second image and wherein the convolution operations share parameters; and
    not including a set of data augmentation operations and a set of one or more sampling operations that were included in a neural network model from which the trained neural network is derived; and
  outputting a depth map comprising distance information to surfaces in the scene; and
a hardware accelerator component, communicatively coupled to the processor unit, configured to perform at least some of the operations of the trained neural network model.

11. The image processing system of claim 10, wherein the processor unit operates using a floating-point bit representation and the hardware accelerator component uses fewer bits and uses a fixed-bit representation.

12. The image processing system of claim 10, wherein the trained neural network model is obtained, at least in part, by training the neural network model using a bit representation conversion used by the hardware accelerator component when the trained neural network is deployed.

13. The image processing system of claim 12, wherein the step using a bit representation conversion used by the hardware accelerator component when the trained neural network is deployed comprises:
  converting input data for the operation from a floating-point bit representation used by the processor unit to a fixed-bit representation used by the hardware accelerator component;
  converting operation parameter data for the operation from a floating-point bit representation used by the processor unit to a fixed-bit representation used by the hardware accelerator component;
  dequantizing the fixed-bit representation of the input data and the operation parameter data to a floating-point representation;
  performing the operation using the dequantized floating-point representation of the input data and the operation parameter data; and
  outputting a set of results data from the operation in the dequantized floating-point representation.

14. The image processing system of claim 10, wherein the image processing system performs at least some of the operations of the trained neural network model using a different bit representation than that used by the processor unit by performing the steps comprising:
  converting input data for the operation from a floating-point bit representation used by the processor unit to a fixed-bit representation used by the hardware accelerator component;
  converting operation parameter data for the operation from a floating-point bit representation used by the processor unit to a fixed-bit representation used by the hardware accelerator component;
  performing the operation at the hardware accelerator component using the fixed-bit representation of the input data and the operation parameter data to obtain results data; and
  dequantizing the fixed-bit representation of the results data to a floating-point representation.

15. The image processing system of claim 14, wherein the results data is interim results data and the image processing system further performs the steps comprising:
  performing, using the hardware accelerator component, one or more operations on the dequantized fixed-bit representation of the interim results data before submitting results data to the processor unit.

16. A method for processing image data to obtain depth information related to a scene captured by a pair of images, the method comprising:
  receiving the pair of images, which comprises a first image and a second image, of the scene at an image processing system comprising:
    a processor unit configured to coordinate a workflow for a trained neural network model by assigning at least some of the computation tasks of the trained neural network model to a hardware accelerator component;
    a non-transitory computer-readable memory communicatively coupled to the processor unit for storing data related to the pair of images and data comprising one or more sequences of instructions related to the trained neural network; and
    a hardware accelerator component, communicatively coupled to the processor unit, configured to perform at least some operations of a trained neural network model using a different bit representation than that used by the processor unit;
  using the image processing system, performing depth map inference using the pair of images and the trained neural network model that comprises a plurality of operations, in which at least some of the operations of the plurality of operations of the trained neural network model are performed by the hardware accelerator component that is communicatively coupled to the processor unit, wherein a neural network model used in training the trained neural network model comprised one or more data augmentation layers and one or more sampling layers that are absent in the trained neural network model to improve processing time; and
  outputting a depth map comprising depth information to surfaces in the scene.

17. The method of claim 16, wherein the processor unit operates using a floating-point bit representation and the hardware accelerator component uses fewer bits and uses a fixed-bit representation.

18. The method of claim 16, wherein a neural network model used in obtaining the trained neural network model was trained, at least in part, by using a bit representation conversion used by the hardware accelerator component.

19. The method of claim 16, wherein the trained neural network model reduces computation by comprising two convolution operations in the trained neural network model that each operate on image-related data corresponding to the first image and on image-related data corresponding to the second image instead of operating on a set of data representing a combination of image-related data corresponding to the first and second images and the convolution operations share parameters.

20. The method of claim 16, wherein the image processing system performs at least some of the operations of the trained neural network model using a different bit representation than that used by the processor unit by performing the steps comprising:

converting input data for the operation from a floating-point bit representation used by the processor unit to a fixed-bit representation used by the hardware accelerator component;

converting operation parameter data for the operation from a floating-point bit representation used by the processor unit to a fixed-bit representation used by the hardware accelerator component; and performing the operation at the hardware accelerator component using the fixed-bit representation of the input data and the operation parameter data.

\* \* \* \* \*